(12) United States Patent
Xie et al.

(10) Patent No.: US 12,425,447 B2
(45) Date of Patent: Sep. 23, 2025

(54) IPV6 PACKET SENDING METHOD, DEVICE, AND SYSTEM

(71) Applicant: Huawei Technologies Co., Ltd., Shenzhen (CN)

(72) Inventors: Jingrong Xie, Beijing (CN); Xuesong Geng, Beijing (CN); Fanghong Duan, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 367 days.

(21) Appl. No.: 18/164,415

(22) Filed: Feb. 3, 2023

(65) Prior Publication Data
US 2023/0188458 A1 Jun. 15, 2023

Related U.S. Application Data

(63) Continuation of application No. PCT/CN2021/082064, filed on Mar. 22, 2021.

(30) Foreign Application Priority Data

Aug. 6, 2020 (CN) .................. 202010785073.1
Sep. 10, 2020 (CN) .................. 202010944510.X

(51) Int. Cl.
H04L 9/40 (2022.01)
H04L 45/00 (2022.01)
H04L 45/16 (2022.01)

(52) U.S. Cl.
CPC .......... H04L 63/1466 (2013.01); H04L 45/00 (2013.01); H04L 45/16 (2013.01); H04L 45/20 (2013.01); H04L 45/70 (2013.01)

(58) Field of Classification Search
None
See application file for complete search history.

(56) References Cited

U.S. PATENT DOCUMENTS 7,310,332 B2   12/2007  Kadambi et al.
11,121,984 B2 * 9/2021  Pelekhaty ............... H04L 45/66
(Continued)

FOREIGN PATENT DOCUMENTS

CN   101674312 A    3/2010
CN   108449774 A    8/2018
CN   109688071 A    4/2019
WO   2022012073 A1  1/2022

OTHER PUBLICATIONS

D. Lamparter et al., Destination/Source Routing, draft-ietf-rtgwg-dst-src-routing-07, rtgwg Internet-Draft, Mar. 10, 2019, 41 pages.
(Continued)

Primary Examiner — Anh Vu H Ly
(74) Attorney, Agent, or Firm — Slater Matsil, LLP

(57) ABSTRACT

An IPv6 packet sending method, a device, and a system is provided. The method includes a first network device receives a first IPv6 packet, where the first IPv6 packet includes a packet header and an inner packet, and the packet header includes a hop limit field. The network device further determines whether a value of the hop limit field is less than or equal to a preset threshold, determines whether the inner packet is a multicast packet, and avoids forwarding the first IPv6 packet when the value of the hop limit field is less than or equal to the preset threshold and the inner packet is the multicast packet.

20 Claims, 7 Drawing Sheets

(56) References Cited

U.S. PATENT DOCUMENTS

| | | |
|---|---|---|
| 2006/0013154 A1 | 1/2006 | Choi et al. |
| 2008/0056278 A1 | 3/2008 | Kadambi et al. |
| 2010/0202454 A1* | 8/2010 | Miller .................... H04L 69/16 |
| | | 370/390 |
| 2011/0222412 A1* | 9/2011 | Kompella ............... H04L 45/70 |
| | | 370/241.1 |
| 2014/0112144 A1* | 4/2014 | Takazoe ........... H04W 28/0231 |
| | | 370/235 |
| 2017/0257348 A1* | 9/2017 | Jain ..................... H04L 63/0254 |
| 2018/0048666 A1 | 2/2018 | Alderson |
| 2018/0241671 A1* | 8/2018 | Bosch ..................... H04L 69/22 |
| 2019/0149449 A1* | 5/2019 | Morris .................... H04L 45/02 |
| | | 709/245 |

OTHER PUBLICATIONS

D. Voyer, Ed et al., SR Replication Segment for Multi-point Service Delivery, draft-ietf-spring-sr-replication-segment-03, Oct. 29, 2020, 18 pages.

R. Raszuk, Ed., IP Traffic Engineering Architecture with Network Programming, draft-raszuk-teas-ip-te-np-00, TEAS Working Group Internet-Draft, Oct. 2, 2019, 43 pages.

D. Voyer, Ed et al., Segment Routing Point-to-Multipoint Policy, draft-voyer-pim-sr-p2mp-policy-01, Network Working Group Internet-Draft, Apr. 13, 2020, 23 pages.

Tsunoda Tohoku Institute of Technology H: "BGP/MPLS Layer 3 VPN Multicast Management Information Base; draft-ietf-bess-mvpn-mib-10. txt", BGP/MPLS Layer 3 VPN Multicast Management Information Base; draft-ietf-bess-mvpn-mib-10.txt; Internet-Draft: Network Working Group, Internet Engineering Task Force, IETF; Standardworkingdraft, Internet Society (ISOC) 4, Rue Des Falaises CH-1205 Gene, No. 10, Aug. 10, 2018 (Aug. 10, 2018), pp. 1-56, XP015128059.

Stephen R Hanna et al: "Multicast Address Dynamic Client Allocation Protocol (MADCAP); draft-ietf-malloc-madcap-06. txt", Multicast Address Dynamic Client Allocation Protocol (MADCAP); draft-ietf-malloc-madcap-06.txt, Internet Engineering Task Force, IETF; Standardworkingdraft, Internet Society(ISOC) 4, Rue Des Falaises CH-1205 Geneva, Switzerland, vol. malloc, No. 6, Aug. 1, 1999 (Aug. 1, 1999), XP015022557. total 48 pages.

* cited by examiner

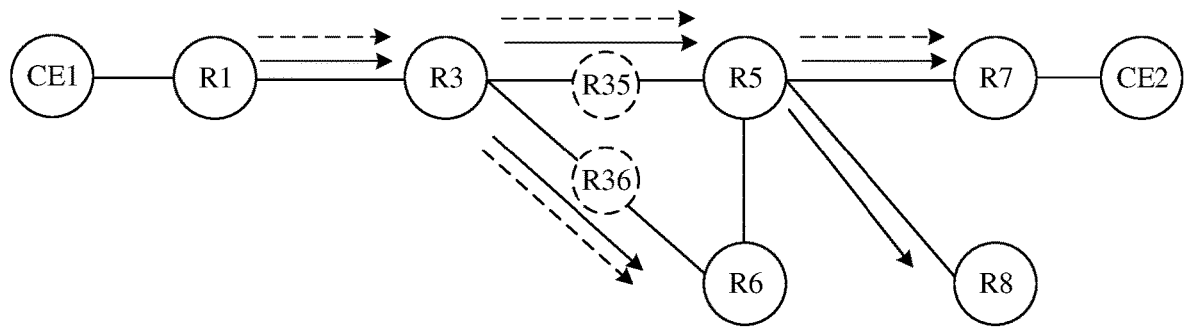

FIG. 1

```
                                                                    210
┌─────────────────────────────────────────────────────────────────┐ ╱
│ A first network device receives a first IPv6 packet, where the  │
│ first IPv6 packet includes a packet header and an inner packet, │
│ and the packet header includes a hop limit (hop limit) field    │
└─────────────────────────────────────────────────────────────────┘
                                  │
                                  │                                 220
┌─────────────────────────────────────────────────────────────────┐ ╱
│ The first network device determines whether a value of the hop  │
│ limit (hop limit) field in the first IPv6 packet is less than   │
│ or equal to a preset threshold on the first network device,     │
│ where the preset threshold is a number greater than or equal to 2│
└─────────────────────────────────────────────────────────────────┘
                                  │
                                  │                                 230
┌─────────────────────────────────────────────────────────────────┐ ╱
│  The first network device determines whether the inner packet   │
│                      is a multicast packet                      │
└─────────────────────────────────────────────────────────────────┘
                                  │
                                  │                                 240
┌─────────────────────────────────────────────────────────────────┐ ╱
│ The first network device avoids forwarding the first IPv6 packet│
│ when the value of the hop limit field in the first IPv6 packet  │
│ is less than or equal to the preset threshold and the inner     │
│ packet is the multicast packet                                  │
└─────────────────────────────────────────────────────────────────┘
```

FIG. 2

IPV6 PACKET SENDING METHOD, DEVICE, AND SYSTEM

CROSS-REFERENCE TO RELATED APPLICATIONS

This application is a continuation of International Application No. PCT/CN2021/082064, filed on Mar. 22, 2021, which claims priorities to Chinese Patent Application No. 202010944510.X, filed on Sep. 10, 2020 and Chinese Patent Application No. 202010785073.1, filed on Aug. 6, 2020. All of the aforementioned patent applications are hereby incorporated by reference in their entireties.

TECHNICAL FIELD

This application relates to the field of network communication, and more specifically, to an IPv6 packet sending method, a network device, and a system.

BACKGROUND

In a process of forwarding an internet protocol version 6 (IPv6) packet, when a value of a hop limit field in an outer IPv6 header of the IPv6 packet is less than or equal to 1, the IPv6 packet is not forwarded to a downstream device, but an internet control message protocol version 6 (ICMPv6) error packet is sent to a source address of the outer IPv6 header.

If an attacker forges an IPv6 in which a value of a hop limit field is less than or equal to 1, a source address of an outer IPv6 header receives a plurality of or even a large quantity of ICMPv6 error packets. Therefore, how to avoid forwarding a plurality of or even a large quantity of ICMPv6 error packets generated by a network device and improve security of IPv6 packet forwarding becomes an urgent problem to be resolved currently.

SUMMARY

This application provides an IPv6 packet sending method, a network device, and a system, so that a waste of network bandwidth and a waste of bandwidth of an attacked device that are caused by a plurality of or even a large quantity of ICMPv6 error packets can be avoided, and security of IPv6 packet forwarding can be improved.

According to a first aspect, an IPv6 packet sending method is provided, including the following. A first network device receives a first IPv6 packet, where the first IPv6 packet includes an outer IPv6 packet header and an inner packet, and the packet header includes a hop limit hop limit field; and the first network device determines whether a value of the hop limit field in the first IPv6 packet is less than or equal to a preset threshold on the first network device, where the preset threshold is a number greater than or equal to 2; the first network device determines whether the inner packet is a multicast packet; and the first network device avoids forwarding the first IPv6 packet when the value of the hop limit field in the first IPv6 packet is less than or equal to the preset threshold, the inner packet is the multicast packet, and a destination address in the outer IPv6 header is a unicast address.

It should be understood that, that the first network device avoids forwarding the IPv6 packet may be considered as that the first network device prevents the IPv6 packet from being sent to a next-hop device, or may be considered as that the first network device skips forwarding the IPv6 packet. That is, the first network device does not send the IPv6 packet to the next-hop device of the first network device.

In the foregoing technical solution, the threshold greater than or equal to 2 may be configured on the first network device (a device that supports multicast forwarding based on the unicast destination address of the IPv6 packet), and the first network device avoids forwarding the IPv6 packet when checking that a hop limit in the packet is less than or equal to the threshold before forwarding the IPv6 packet. In this way, a probability that ICMPv6 error packets are generated on the first network device because a value of the IPv6 hop limit is 1 or 0 can be reduced, so that security of IPv6 packet forwarding can be improved, and a waste of network bandwidth and a waste of bandwidth of an attacked device that are caused by a plurality of or even a large quantity of ICMPv6 error packets can be avoided.

In a possible implementation, the method further includes the first network device discards the first IPv6 packet.

In another possible implementation, the preset threshold is a threshold determined based on a quantity of one or more consecutive second network devices connected to the first network device, the second network device is a network device that performs unicast forwarding based on a destination address of an IPv6 packet received from the first network device, and the destination address of the IPv6 packet received from the first network device is different from an address of the second network device.

In the foregoing technical solution, the first network device avoids forwarding the IPv6 packet when checking that a hop limit in the packet is less than or equal to the threshold before forwarding the IPv6 packet. In this way, a probability that ICMPv6 error packets are generated because a value of the IPv6 hop limit is 1 or 0 when a BIERv6 packet is sent to the foregoing second network device can be reduced, so that security of IPv6 packet forwarding can be improved, and a waste of network bandwidth and a waste of bandwidth of an attacked device that are caused by a plurality of or even a large quantity of ICMPv6 error packets can be avoided.

In another possible implementation, the method further includes: The first network device receives a second IPv6 packet, where the second IPv6 packet includes a packet header and an inner packet, and the packet header includes a hop limit field; the first network device determines whether a value of the hop limit field in the second IPv6 packet is less than or equal to the preset threshold; and the first network device determines whether the inner packet of the second IPv6 packet is the multicast packet; and the first network device processes the second IPv6 packet when the value of the hop limit field in the second IPv6 packet is greater than the preset threshold and the inner packet of the second IPv6 packet is the multicast packet.

In another possible implementation, if the first network device is an intermediate forwarding device, the first network device sends the second IPv6 packet to a second network device, and the second network device forwards the second IPv6 packet to a third network device, where a destination address of the second IPv6 packet is an address of the third network device; or if the first network device is an egress device, the first network device decapsulates the second IPv6 packet, and forwards the inner packet obtained after the second IPv6 packet is decapsulated.

In another possible implementation, the multicast packet includes any one of the following: an IPv6 multicast packet, an internet protocol version 4 IPv4 multicast packet, or an ethernet packet.

In another possible implementation, the value of the hop limit field in the first IPv6 packet is less than or equal to the preset threshold, and the method further includes: The first network device avoids forwarding the IPv6 packet if a transmission rate of the first IPv6 packet is greater than a preset rate when the inner packet of the first IPv6 packet is an operation administration and maintenance OAM packet.

In the foregoing technical solution, on a premise of considering how to support OAM, security of IPv6 packet forwarding can also be improved, and a waste of network bandwidth and a waste of bandwidth of an attacked device that are caused by a plurality of or even a large quantity of ICMPv6 error packets can also be avoided; or it can also be ensured that an OAM detection function is not affected while security of IPv6 packet transmission is improved.

In another possible implementation, the method further includes: The first network device discards the first IPv6 packet.

In another possible implementation, the value of the hop limit field in the first IPv6 packet is less than or equal to the preset threshold, and the method further includes: The first network device forwards the first IPv6 packet if the transmission rate of the first IPv6 packet is less than or equal to the preset rate when the inner multicast packet is the OAM packet.

According to a second aspect, a first network device is provided, including: a receiving module, configured to receive a first IPv6 packet, where the first IPv6 packet includes a packet header and an inner packet, and the packet header includes a hop limit hop limit field; and a processing module, configured to determine whether a value of the hop limit field in the first IPv6 packet is less than or equal to a preset threshold on the first network device, where the preset threshold is a number greater than or equal to 2.

The processing module is further configured to determine whether the inner packet is a multicast packet.

The processing module is further configured to avoid forwarding the first IPv6 packet when the value of the hop limit field in the first IPv6 packet is less than or equal to the preset threshold and the inner packet is the multicast packet.

In a possible implementation, the processing module is further configured to: discard the first IPv6 packet.

In another possible implementation, the preset threshold is a threshold determined based on a quantity of one or more consecutive second network devices connected to the first network device, the second network device is a network device that performs unicast forwarding based on a destination address of an IPv6 packet received from the first network device, and the destination address of the IPv6 packet received from the first network device is different from an address of the second network device.

In another possible implementation, the receiving module is further configured to receive a second IPv6 packet, where the second IPv6 packet includes a packet header and an inner packet, and the packet header includes a hop limit field.

The processing module is further configured to determine whether a value of the hop limit field in the second IPv6 packet is less than or equal to the preset threshold.

The processing module is further configured to determine whether the inner packet of the second IPv6 packet is the multicast packet.

The processing module is further configured to process the second IPv6 packet when the value of the hop limit field in the second IPv6 packet is greater than the preset threshold and the inner packet of the second IPv6 packet is the multicast packet.

In another possible implementation, the processing module is specifically configured to: send, if the first network device is an intermediate forwarding device, the second IPv6 packet to a second network device, and forward, by the second network device, the second IPv6 packet to a third network device, where a destination address of the second IPv6 packet is an address of the third network device; or decapsulate, if the first network device is an egress device, the second IPv6 packet, and forward the inner packet obtained after the second IPv6 packet is decapsulated.

In another possible implementation, the multicast packet includes any one of the following: an IPv6 multicast packet, an internet protocol version 4 IPv4 multicast packet, or an ethernet packet.

In another possible implementation, the value of the hop limit field in the first IPv6 packet is less than or equal to the preset threshold, and the processing module is further configured to: avoid forwarding the IPv6 packet if a transmission rate of the first IPv6 packet is greater than a preset rate when the inner packet of the first IPv6 packet is an operation administration and maintenance OAM packet.

In another possible implementation, the processing module is further configured to: discard the first IPv6 packet.

In another possible implementation, the value of the hop limit field in the first IPv6 packet is less than or equal to the preset threshold, and the processing module is further configured to: forward the first IPv6 packet if the transmission rate of the first IPv6 packet is less than or equal to the preset rate when the inner multicast packet is the OAM packet.

Advantageous effects of the second aspect and any one of the possible implementations of the second aspect correspond to advantageous effects of the first aspect and any one of the possible implementations of the first aspect. Details are not described herein again.

According to a third aspect, a first network device is provided. The first network device has a function of implementing behavior of the first network device in the foregoing method. The function may be implemented based on hardware, or may be implemented based on hardware executing corresponding software. The hardware or the software includes one or more modules corresponding to the foregoing function.

In a possible design, a structure of the first network device includes a processor and an interface. The processor is configured to support the first network device to perform a corresponding function in the foregoing method. The interface is configured to support the first network device in receiving a first IPv6 packet or receiving a second IPv6 packet.

The first network device may further include a memory. The memory is configured to be coupled to the processor, and store program instructions and data that are required for the first network device.

In another possible design, the first network device includes a processor, a transmitter, a receiver, a random access memory, a read-only memory, and a bus. The processor is coupled to the transmitter, the receiver, the random access memory, and the read-only memory through the bus. When the first network device needs to be run, a bootloader in a basic input/output system built into the read-only memory or in an embedded system is used to boot a system to start, and boot the first network device to enter a normal running state. After entering the normal running state, the first network device runs an application program and an operating system in the random access memory, so that the processor performs the method in the first aspect or any one of the possible implementations of the first aspect.

According to a fourth aspect, a first network device is provided. The first network device includes a main control board and an interface board, and may further include a switching board. The first network device is configured to perform the method in the first aspect or any one of the possible implementations of the first aspect. Specifically, the first network device includes modules configured to perform the method in the first aspect or any one of the possible implementations of the first aspect.

According to a fifth aspect, a first network device is provided. The first network device includes a control module and a first forwarding subdevice. The first forwarding subdevice includes an interface board, and may further include a switching board. The first forwarding subdevice is configured to perform a function of the interface board in the fourth aspect, and may further perform a function of the switching board in the fourth aspect. The control module includes a receiver, a processor, a transmitter, a random access memory, a read-only memory, and a bus. The processor is coupled to the receiver, the transmitter, the random access memory, and the read-only memory through the bus. When the control module needs to be run, a bootloader in a basic input/output system built into the read-only memory or in an embedded system is used to boot a system to start, and boot the control module to enter a normal running state. After entering the normal running state, the control module runs an application program and an operating system in the random access memory, so that the processor performs a function of the main control board in the sixth aspect.

It may be understood that, in actual application, the first network device may include any quantity of interfaces, processors, or memories.

According to a sixth aspect, a computer program product is provided. The computer program product includes computer program code. When the computer program code is run on a computer, the computer is enabled to perform the method in the first aspect or any one of the possible implementations of the first aspect.

According to a seventh aspect, a computer-readable medium is provided. The computer-readable medium stores program code. When the computer program code is run on a computer, the computer is enabled to perform the method in the first aspect or any one of the possible implementations of the first aspect. The computer-readable storage includes, but is not limited to, one or more of the following: a read-only memory (ROM), a programmable ROM (PROM), an erasable PROM (EPROM), a Flash memory, an electrically EPROM (EEPROM), or a hard drive.

According to an eighth aspect, a chip is provided. The chip includes a processor and a data interface, and the processor reads, through the data interface, instructions stored in a memory, to perform the method in the first aspect or any one of the possible implementations of the first aspect. In a specific implementation process, the chip may be implemented in a form of a central processing unit (CPU), a micro controller unit (MCU), a micro processing unit (MPU), a digital signal processor (DSP), a system on chip (SoC), an application-specific integrated circuit (ASIC), a field programmable gate array (FPGA), or a programmable logic device (PLD).

According to a ninth aspect, an IPv6 packet sending system is provided. The system includes the foregoing first network device.

BRIEF DESCRIPTION OF THE DRAWINGS

FIG. 1 is a schematic diagram of a scenario applicable to embodiments of this application;

FIG. 2 is a schematic flowchart of an IPv6 packet sending method according to an embodiment of this application;

DETAILED DESCRIPTION OF ILLUSTRATIVE EMBODIMENTS

Figure 3:
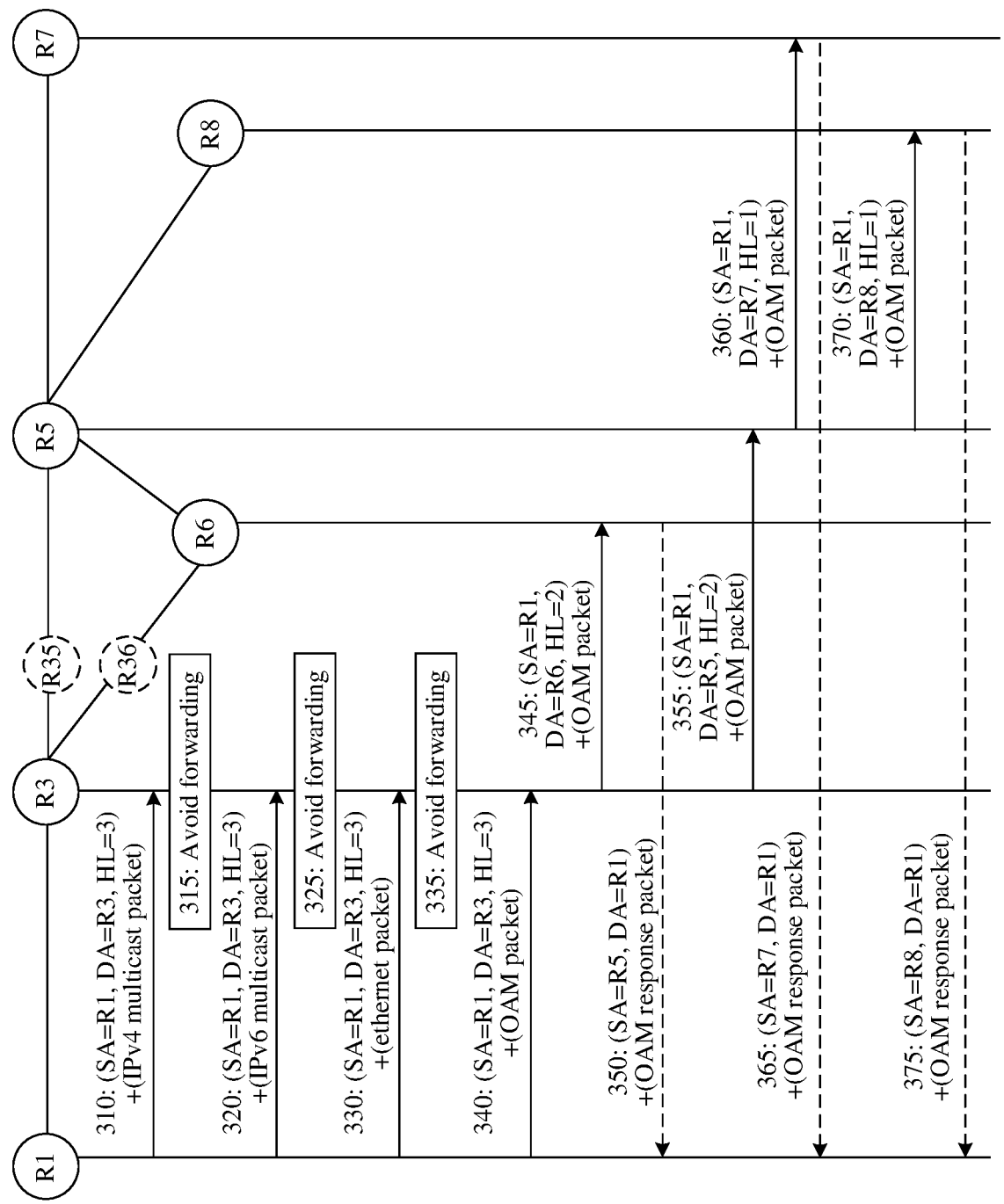
FIG. 3 is a schematic flowchart of another IPv6 packet sending method according to an embodiment of this application.

The following describes technical solutions of this application with reference to the accompanying drawings.

All aspects, embodiments, or features are presented in this application based on a system that includes a plurality of devices, components, and modules. It should be appreciated and understood that, each system may include another device, component, module, and the like, and/or may not include all devices, components, modules, and the like discussed with reference to the accompany drawings. In addition, a combination of these solutions may be used.

In addition, in embodiments of this application, the terms such as "for example" and "such as" are used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

In the embodiments of this application, "corresponding (relevant)" and "corresponding" may be interchangeably used sometimes. It should be noted that, meanings expressed by the terms are consistent when differences are not emphasized.

A network architecture and a service scenario described in the embodiments of this application are intended to describe the technical solutions in the embodiments of this application more clearly, but constitute no limitation on the technical solutions provided in the embodiments of this application. A person of ordinary skill in the art may learn that the technical solutions provided in the embodiments of this application are also applicable to a similar technical problem as the network architecture evolves and a new service scenario emerges.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have" and their variations mean "including but not limited to", unless otherwise specially emphasized in other ways.

In this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" usually indicates an "or" relationship between associated objects. At least one of the following items (pieces) or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

Multicast is a data transmission manner of simultaneously sending a user multicast packet to a plurality of receivers on a network in a transmission control protocol (TCP)/an internet protocol (IP) in an efficient manner by using a multicast address. A multicast source sends multicast traffic to multicast group members in a multicast group through links in a network, and each multicast group member in the multicast group can receive the multicast traffic. In the multicast transmission manner, a point-to-multipoint data connection is implemented between the multicast source and the multicast group members. The multicast traffic needs to be transmitted only once on each network link, and multicast replication is performed only when there is a branch on the link. Therefore, in the multicast transmission manner, data transmission efficiency is improved and a possibility of congestion on a backbone network is reduced.

An IP multicast technology uses a multicast group address as a destination address of a packet, uses protocol independent multicast (PIM) signaling to establish a multicast forwarding tree, and uses the multicast forwarding tree to form a logical tree on a network plane, to implement point-to-multipoint multicast data forwarding. The IP multicast technology that establishes the multicast forwarding tree can implement efficient point-to-multipoint data transmission in an IP network, effectively save network bandwidth, and reduce network load. Therefore, the IP multicast technology is widely used in many aspects, for example, real-time data transmission, multimedia conference, data copy, an internet protocol television (IPTV), games, and simulation.

As an example, the foregoing IP multicast technology may be implemented by using an internet protocol version 6 (IPv6) unicast address as a destination address of a packet. A point-to-multipoint (P2MP) forwarding path is established between one ingress router and a plurality of egress routers, and a multicast packet is forwarded along the P2MP forwarding path. As an example, the P2MP forwarding path may be used as a tunnel, the ingress router encapsulates a user multicast packet in the tunnel, and the egress routers decapsulate the user multicast packet to restore and send the user multicast packet.

FIG. 1 is a schematic diagram of a scenario applicable to embodiments of this application. A segment routing replication (SR-replication) field in FIG. 1 may include R1, R3, R5, R6, R7, and R8. R1 is an ingress device of the segment routing replication field, and is responsible for performing IPv6 encapsulation on a user multicast packet. Specifically, R1 may encapsulate an IPv6 header at an outer layer of the user multicast packet, and the IPv6 header may include a destination address (DA) field and a source address (SA) field. R3 and R5 are intermediate forwarding (transit) devices of the segment routing replication field, and are responsible for forwarding the packet based on the destination address (DA) in the IPv6 header encapsulated at the outer layer of the user multicast packet. R6, R7, and R8 are egress devices of the segment routing replication field, and are responsible for decapsulating the encapsulated user multicast packet, and then forwarding an inner user multicast packet.

A type of the foregoing user multicast packet is not specifically limited in this embodiment of this application. The user multicast packet may be an internet protocol version 4 (IPv4) multicast packet, or may be an internet protocol version 6 (IPv6) multicast packet, or may be an ethernet packet.

The foregoing R1 is used as the ingress device of the segment routing replication field, and a format of the IPv6 packet encapsulated by R1 is: the outer IPv6 header+the user multicast packet (the IPv4 multicast packet, the IPv6 multicast packet, or the ethernet packet). In this embodiment of this application, there are a plurality of specific implementations for partitioning the type of the user multicast packet following the outer IPv6 header. The following describes several possible implementations in detail.

In a possible implementation, different types of user multicast packets may be identified by using a value of a next header (NH) field of the outer IPv6 header. For example, that the value of the next header field is 4 may indicate that the user multicast packet following the outer IPv6 header is the IPv4 multicast packet. In another example, that the value of the next header field is 41 may indicate that the user multicast packet following the outer IPv6 header is the IPv6 multicast packet. In another example, that the value of the next header field is 143 may indicate that the user multicast packet following the outer IPv6 header is the ethernet packet.

In another possible implementation, the type of the user multicast packet may be further determined by using a destination address (DA) field of an inner user multicast packet. For example, if an address of the DA field is an IPv4 multicast address (specifically, high 4 bits of the IPv4 address are 1110, that is, an address range is from 224.0.0.0 to 239.255.255.255), it may be determined that the user multicast packet is the IPv4 multicast packet. In another example, if the address of the DA field is an IPv6 multicast address (specifically, a first byte of the IPv6 address is 0xff), it may be determined that the user multicast packet is the IPv6 multicast packet.

It should be noted that, for the ethernet packet, an ethernet header thereof is also followed by the IPv4 or IPv6 multicast packet. Therefore, the foregoing method is also applicable.

Optionally, in some embodiments, multicast forwarding based on an IPv6 unicast address may further support an operation maintenance and management (OAM) function. Therefore, the user multicast packet may also be an operation administration and maintenance (OAM) packet.

The foregoing process of multicast forwarding based on the IPv6 unicast address is to forward based on a manner of changing the IPv6 unicast address in the outer IPv6 header hop by hop.

In the scenario shown in FIG. 1, there are a plurality of specific implementations for which a device in a network performs multicast packet forwarding by using the IPv6 unicast address as a destination address. This is not specifically limited in this application. The following respectively describes two possible implementations in detail.

It should be understood that, in a plurality of implementations described below, the IPv6 unicast address is used as the destination address, and the destination address is changed in a forwarding process. For example, a destination address of a packet sent by R1 to R3 is a unicast address of R3, destination addresses of packets sent by R3 to R5 and R6 are respectively addresses of R5 and R6, and destination addresses of packets sent by R5 to R7 and R8 are respectively addresses of R7 and R8.

It should be further understood that, in the scenario shown in FIG. 1, IPv6 unicast addresses configured on devices may be different, or a same IPv6 unicast address may also be configured on two or more devices. If the same IPv6 unicast address is configured on two or more devices, IPv6 anycast may be formed.

For ease of description, the following uses an example in which the devices use different IPv6 unicast addresses for description.

In a possible implementation, when a plurality of multicast trees (which may also be referred to as P2MP trees) need to be established by using R1 as a root node, the devices (R1, R3, R5, R6, R7, and R8) in the segment routing replication field shown in FIG. 1 need to reserve a plurality of addresses in respective IPv6 address spaces, to achieve an objective of establishing the plurality of multicast trees by using R1 as the root node.

1. A multicast tree identified by solid lines shown in FIG. 1 is used as an example. Information about the multicast tree identified by the solid lines and delivered by a controller is shown in the following Table 1.

TABLE 1

The information about the multicast tree identified by the solid lines

R1: (RepID = 1, branch = R3) //(RepID, branch) information delivered by the controller to R1;
R3: (RepID = 1, branch = R5/R6) //(RepID, branch) information delivered by the controller to R3;
R5: (RepID = 1, branch = R7/R8) //(RepID, branch) information delivered by the controller to R5;
R6: (RepID = 1, branch = Decap) //(RepID, branch) information delivered by the controller to R6;
R7: (RepID = 1, branch = Decap) //(RepID, branch) information delivered by the controller to R7;
R8: (RepID = 1, branch = Decap) //(RepID, branch) information delivered by the controller to R8;

The replication identifier (RepID)=1 is the multicast tree identified by the solid lines. Branch information of a device may be one or more P2MP downstream devices of the device. It should be understood that, if the device is a P2MP leaf device, packet decapsulation usually needs to be performed on the device, and then an inner multicast packet is forwarded. Therefore, the leaf device may have no downstream device, and branch information corresponding to the leaf device may be indicated by using decapsulation (decap).

P2MP forwarding entries generated by the devices in FIG. 1 based on the information about the multicast tree identified by the solid lines and delivered by the controller are shown in the following Table 2.

TABLE 2

The P2MP forwarding entries corresponding to the multicast tree identified by the solidl ines R1: (DA = R1_1, branch_IP = R3_1)
R3: (DA = R3_1, branch_IP = R5_1/R6_1)
R5: (DA = R5_1, branch_IP = R7_1/R8_1)
R6: (DA = R6_1, branch_IP = Decap)
R7: (DA = R7_1, branch_IP = Decap)
R8: (DA = R8_1, branch_IP = Decap)

The destination address (DA) R1_1 in the table is determined based on a node identifier (node ID) of R1 and RepID=1. When applied to an IPv6 data plane, R1_1 is an IPv6 address. A manner of determining another address is the same as a manner of determining the destination address R1_1, and details are not described herein again.

By using R1 as an example, if it is obtained that a destination address in an outer IPv6 header of a packet is R1_1, a forwarding plane further searches for a forwarding table of DA=R1_1, finds the P2MP entry described above, and learns that the packet needs to be "replicated" to R3_1. Therefore, the forwarding plane then changes the destination address of the packet to R3_1 and sends the packet to a node of R3. Then, the packet is sent to each leaf node along the P2MP tree identified by the solid lines, and is decapsulated by each leaf node.

2. A multicast tree identified by dashed lines shown in FIG. 1 is used as an example. Information about the P2MP tree identified by the dashed lines and delivered by a controller is shown in the following Table 3.

TABLE 3

The information about the multicast tree identified by the dashed lines

R1: (RepID = 2, branch = R3) //(RepID, branch) information delivered by the controller to R1;
R3: (RepID = 2, branch = R5/R6) //(RepID, branch) information delivered by the controller to R3;
R5: (RepID = 2, branch = R7) //(RepID, branch) information delivered by the controller to R5;
R6: (RepID = 2, branch = Decap) //(RepID, branch) information delivered by the controller to R6;
R7: (RepID = 2, branch = Decap) //(RepID, branch) information delivered by the controller to R7;
R8: (RepID = 2, branch = Decap) //(RepID, branch) information delivered by the controller to R8;

The replication identifier (replication ID, RepID)=2 is the multicast tree identified by the dashed lines.

P2MP forwarding entries generated by the devices in FIG. 1 based on the information about the multicast tree identified by the dashed lines and delivered by the controller are shown in the following Table 4.

TABLE 4

The P2MP forwarding entries corresponding to the multicast tree identified by the dashed lines R1: (DA = R1_2, branch_IP = R3_2)
R3: (DA = R3_2, branch_IP = R5_2/R6_2)
R5: (DA = R5_2, branch_IP = R7_2)
R6: (DA = R6_2, branch_IP = Decap)
R7: (DA = R7_2, branch_IP = Decap)
R8: (DA = R8_2, branch_IP = Decap)

By using R1 as an example, if it is obtained that a destination address in an outer IPv6 header of a packet is R1_2, a forwarding plane further searches for a forwarding table of DA=R1_2, finds the P2MP entry described above, and learns that the packet needs to be "replicated" to R3_2. Therefore, the forwarding plane then changes the destination address of the packet to R3_2 and sends the packet to a node of R3. Then, the packet is sent to each leaf node along the P2MP tree identified by the dashed lines, and is decapsulated by each leaf node.

In another possible implementation, when a plurality of multicast trees (which may also be referred to as P2MP trees) need to be established by using R1 as the root node, only the root node R1 needs to reserve a plurality of corresponding addresses for the plurality of multicast trees, and other devices in the segment routing replication field shown in FIG. 1 do not need to reserve a plurality of corresponding addresses for the plurality of multicast trees, so that the objective of establishing the plurality of multicast trees by using R1 as the root node can also be achieved.

1. By using an example in which a multicast tree that is identified by solid lines and that uses R1 as the root node in FIG. 1 needs to be established, an address R1_1 of R1 needs to be allocated. The address R1_1 is sent to each node under the multicast tree, and branch information of the multicast tree on each node is sent.

Devices under the multicast tree that is identified by the solid lines and that uses R1 as the root node may include: R1, R3, R5, R6, R7, and R8. Information about the multicast tree identified by the solid lines that is received by each node is shown in Table 5.

TABLE 5

The information about the multicast tree identified by the solid lines

R1: (tree = R1_1, branch = R3)
R3: (tree = R1_1, branch = R5/R6)
R5: (tree = R1_1, branch = R7/R8)
R6: (tree = R1_1, branch = Decap)
R7: (tree = R1_1, branch = Decap)
R8: (tree = R1_1, branch = Decap)

By using R1 as an example, "tree=R1-1" indicates that a multicast tree is the multicast tree identified by the solid lines shown in FIG. 1, and "branch=R3" indicates that a downstream device of R1 is R3.

By using R5 as an example, a multicast tree is the multicast tree identified by the solid lines shown in FIG. 1, and downstream devices of R3 are R7 and R8. For R6, a multicast tree is the multicast tree identified by the solid lines shown in FIG. 1, and "branch=Decap" indicates that R6 is a leaf device, and needs to decapsulate an encapsulated multicast packet and then forward an inner multicast packet.

P2MP forwarding entries established by the devices in the network based on the information about the multicast tree shown in Table 5 are shown in Table 6.

TABLE 6

The P2MP forwarding entries corresponding to the multicast tree identified by the solid lines R1: (SA = R1_1, branch_IP = R3_0)
R3: (SA = R1_1, branch_IP = R5_0/R6_0)
R5: (SA = R1_1, branch_IP = R7_0/R8_0)
R6: (SA = R1_1, branch_IP = Decap)
R7: (SA = R1_1, branch_IP = Decap)
R8: (SA = R1_1, branch_IP = Decap)

It should be understood that, each of the devices in the network is respectively configured with a first address that is to be used as a destination address of a packet, and the first address is used for instructing to search for a source address corresponding to the packet based on the destination address of the packet. When a destination address of a packet received by a device is the first address, the device searches for a source address of the packet.

As an example, first addresses allocated to R1, R3, R5, R6, R7, and R8 are respectively Rio, R3_0, R5_0, R6_0, R7_0, and R8_0. When a destination address of a packet received by R1 is R1_0, R1 searches for a source address of the packet. When a destination address of a packet received by R3 is R3_0, R3 searches for a source address of the packet. The rest is deduced by analogy.

By using R1 as an example, because the multicast tree is the multicast tree identified by the solid lines shown in FIG. 1 and the downstream device of R1 is R3, "SA=R1_1" in the P2MP forwarding entry established by R1 indicates that a source address is R1_1, and "branch_IP=R3_0" indicates that an IP address of the downstream device of R1 is the first address R3_0 allocated to R3.

R1 obtains that a destination address of an outer IPv6 header of a packet is R1_0, and searches for a source address SA of the packet based on an indication of R1_0. R1 determines that the source address SA of the packet is R1_1, and determines, based on the P2MP forwarding entries shown in Table 6, that branch_IP corresponding to SA=R1_1 is R3_0. Therefore, R1 learns that the packet needs to be "replicated" to R3_0, and a forwarding plane of R1 may change the destination address of the packet to R3_0 and send the packet to a node of R3. By analogy, a destination address of a packet received by R5 is R5_0, and R5 searches for a source address SA of the packet based on an indication that the destination address is R5_0. R5 determines that the source address SA of the packet is R1_1, and determines, based on the P2MP forwarding entries shown in Table 7, that branch_IP corresponding to SA=R1_1 is R7_0/R8_0. Therefore, R5 learns that the packet needs to be "replicated" to R7_0 and R8_0, and a forwarding plane of R5 may change the destination address of the packet to R7_0 and send the packet to a node of R7, and change the destination address of the packet to R8_0 and send the packet to a node of R8. Then, the packet is sent to each leaf node along the P2MP tree identified by the solid lines, and is decapsulated by each leaf node.

2. By using an example in which a multicast tree that is identified by dashed lines and that uses R1 as the root node in FIG. 1 needs to be established, an address R1_2 of R1 needs to be allocated. The address R1_2 is sent to each node under the multicast tree, and branch information of the multicast tree on each node is sent.

Devices under the multicast tree that is identified by the dashed lines and that uses R1 as the root node may include: R1, R3, R5, R6, R7, and R8. Information about the multicast tree identified by the dashed lines that is received by each node is shown in Table 7.

TABLE 7

The information about the multicast
tree identified by the dashed lines

R1: (tree = R1_2, branch = R3)
R3: (tree = R1_2, branch = R5/R6)
R5: (tree = R1_2, branch = R7)
R6: (tree = R1_2, branch = Decap)
R7: (tree = R1_2, branch = Decap)
R8: (tree = R1_2, branch = Decap)

By using R1 as an example, "tree=R1_2" indicates that a multicast tree is the multicast tree identified by the dashed lines shown in FIG. 1, and "branch=R3" indicates that a downstream device of R1 is R3.

P2MP forwarding entries established by the devices in the network based on the information about the multicast tree shown in Table 7 are shown in Table 8.

TABLE 8

The P2MP forwarding entries corresponding to
the multicast tree identified by the dashed lines R1: (SA = R1_2, branch_IP = R3_0)
R3: (SA = R1_2, branch_IP = R5_0/R6_0)
R5: (SA = R1_2, branch_IP = R7_0)
R6: (SA = R1_2, branch_IP = Decap)
R7: (SA = R1_2, branch_IP = Decap)
R8: (SA = R1_2, branch_IP = Decap)

By using R1 as an example, because the multicast tree is the multicast tree identified by the dashed lines shown in FIG. 1 and the downstream device of R1 is R3, "SA=R1_2" in the P2MP forwarding entry established by R1 indicates that a source address is R1_2, and "branch_IP=R3_0" indicates that an IP address of the downstream device of R1 is the first address R3_0 allocated to R3.

R1 obtains that a destination address of an outer IPv6 header of a packet is R1_0, and searches for a source address SA of the packet based on an indication of R1_0. R1 determines that the source address SA of the packet is R1_2, and determines, based on the P2MP forwarding entries shown in Table 8, that branch_IP corresponding to SA=R1_2 is R3_0. Therefore, R1 learns that the packet needs to be "replicated" to R3_0, and a forwarding plane of R1 may change the destination address of the packet to R3_0 and send the packet to a node of R3. By analogy, a destination address of a packet received by R5 is R5_0, and R5 searches for a source address SA of the packet based on an indication that the destination address is R5_0. R5 determines that the source address SA of the packet is R1_2, and determines, based on the P2MP forwarding entries shown in Table 8, that branch_IP corresponding to SA=R1_2 is R7_0. Therefore, R5 learns that the packet needs to be "replicated" to R7_0, and a forwarding plane of R5 may change the destination address of the packet to R7_0 and send the packet to a node of R7. Then, the packet is sent to each leaf node along the P2MP tree identified by the dashed lines, and is decapsulated by each leaf node.

A forwarding security problem exists in the foregoing method for performing multicast packet forwarding based on an IPv6 unicast address used as a destination address. As an example, the scenario shown in FIG. 1 further includes a device that does not perform the foregoing "multicast forwarding based on an IPv6 unicast address".

It should be understood that, the device that does not perform the foregoing "multicast forwarding based on an IPv6 unicast address" may be a network device that performs unicast forwarding based on a destination address of a received IPv6 packet, where the destination address of the received IPv6 packet is different from an address of the device.

For example, in FIG. 1, there is R35 between R3 and R5, and there is R36 between R3 and R6. Both R35 and R36 are IPv6 routers and do not perform the foregoing "multicast forwarding based on an IPv6 unicast address". For the device that does not perform the foregoing "multicast forwarding based on an IPv6 unicast address", the destination address of the IPv6 packet is not the address of the device. When a value of a hop limit (HL) field in an outer IPv6 header of a packet received by R3 is 2, R3 actually replicates and sends the packet to R5 and R6 through R35 and R36 respectively according to a protocol specification. The value of the hop limit field in the packet received by R35 and R36 is equal to 1, and R35 and R36 send internet control message protocol version 6 (ICMPv6) error packets to R1 according to a specification of a common IPv6 unicast packet (without detecting that the packet is an IPv6 unicast packet for multicast forwarding), causing a heavy processing pressure on R1.

Particularly, in a scenario in which an IPv6 source address remains unchanged during multicast forwarding and a destination address is a unicast address in a network in which the multicast forwarding is performed based on an IPv6 unicast address, if a packet is a forged packet, for example, R1 sends a packet in which a value of a hop limit field is 2 and a source address is forged to an IPv6 address of R1 to R3, that R35 and R36 simultaneously send ICMPv6 error packets to R1 is caused. A forged packet causes a plurality of ICMPv6 error packets, causing a denial of service (DoS) attack on R1.

For R35 and R36 that do not perform the foregoing "multicast forwarding based on an IPv6 unicast address", in a possible case, R35 and R36 are devices that do not support the foregoing multicast forwarding based on a unicast address. Therefore, such devices need to be traversed (or referred to as skipped) when a corresponding forwarding table is generated. In another possible case, R35 and R36 are devices that support the foregoing multicast forwarding based on a unicast address, but such devices are traversed (or referred to as skipped) when a corresponding forwarding table is generated, to improve forwarding performance of the devices. This is not specifically limited in this application.

Therefore, in a scenario in which multicast forwarding is performed based on an IPv6 unicast address, how to avoid generating a large quantity of ICMPv6 error packets and improve security of packet forwarding becomes an urgent problem to be resolved currently.

In view of this, an embodiment of this application provides an IPv6 packet sending method. A threshold greater than or equal to 2 may be set on a device that performs multicast forwarding based on an IPv6 unicast address. Before forwarding an IPv6 packet, a device that supports multicast forwarding based on an IPv6 unicast address checks a value of a hop limit field in the packet. If the hop limit in the packet is less than or equal to a hop limit threshold on the device and an inner user packet is a multicast packet (where the multicast packet includes, but is not limited to, an IPv4 multicast packet, an IPv6 multicast packet, or an ethernet packet), the device avoids forwarding the IPv6 packet. If the hop limit in the packet is less than or equal to the hop limit threshold and the inner user packet is not the multicast packet (for example, is an OAM packet), the device avoids forwarding a packet whose forwarding rate exceeds a limited rate.

In this way, on the one hand, a probability that the IPv6 packet is sent to devices that perform unicast forwarding based on an IPv6 unicast address can be reduced, so that a probability that ICMPv6 error packets are generated on the devices is reduced, security of IPv6 packet forwarding is improved, and a waste of network bandwidth and a waste of bandwidth of an attacked device that are caused by a large quantity of ICMPv6 error packets are avoided. On the other hand, on a premise of considering how to support OAM, security can also be improved; or it can also be ensured that an OAM detection function is not affected while security of data transmission is improved.

It should be understood that, in this application, avoiding forwarding the IPv6 packet may be considered as preventing the IPv6 packet from being sent to a next-hop device, or may be considered as skipping forwarding the IPv6 packet. That is, avoiding forwarding the IPv6 packet may be considered as not sending the IPv6 packet to the next-hop device.

It should be noted that, a hop limit threshold may be respectively configured on one or more even all devices in a network. As an example, a network manager may respectively configure a hop limit threshold on one or more even all devices. These thresholds may be the same or different. This is not specifically limited in this embodiment of this application.

The following describes an IPv6 packet sending method provided in an embodiment of this application in detail with reference to FIG. 2.

FIG. 2 is a schematic flowchart of an IPv6 packet sending method according to an embodiment of this application. As shown in FIG. 2, the method may include step 210 to step 230. Step 210 to step 230 are respectively described below in detail.

Step 210: A first network device receives a first IPv6 packet, where the first IPv6 packet includes a packet header and an inner packet, and the packet header includes a hop limit field.

The first IPv6 packet may be a common IPv6 packet, or may be a bit indexed explicit replication internet protocol version 6 (BIERv6) packet. This is not specifically limited in this embodiment of this application.

Step 220: The first network device determines whether a value of the hop limit field in the first IPv6 packet is less than or equal to a preset threshold on the first network device, where the preset threshold is a number greater than or equal to 2.

The preset threshold configured on the first network device is the number greater than or equal to 2, the preset threshold may be a threshold determined based on a quantity of one or more consecutive second network devices connected to the first network device, the second network device is a network device that performs unicast forwarding based on a destination address of an IPv6 packet received from the first network device, and the destination address of the IPv6 packet received from the first network device is different from an address of the second network device.

As an example, a hop limit threshold may be configured on the first network device, and a value of the threshold is not less than the quantity of the consecutive second network devices plus 1. The following describes a specific implementation for determining the preset threshold configured on the first network device in detail.

By using the scenario shown in FIG. 1 as an example, R35 is a device that does not perform the foregoing "multicast forwarding based on an IPv6 unicast address". Because both R3 and R5 are connected to R35 and one R35 is connected to R3 and R5, values of preset thresholds on R3 and R5 may be set to numbers not less than 2.

Step 230: The first network device determines whether the inner packet is a multicast packet.

The multicast packet in this embodiment of this application includes, but is not limited to, any one of the following: an IPv6 multicast packet, an internet protocol version 4 IPv4 multicast packet, or an ethernet packet. For a specific implementation for determining a type of the inner packet, refer to the foregoing description. Details are not described herein again.

Step 240: The first network device avoids forwarding the first IPv6 packet when the value of the hop limit field in the first IPv6 packet is less than or equal to the preset threshold and the inner packet is the multicast packet.

It should be understood that, in this application, avoiding forwarding the IPv6 packet may be considered as preventing the IPv6 packet from being sent to a next-hop device, or may be considered as skipping forwarding the IPv6 packet. That is, avoiding forwarding the IPv6 packet may be considered as not sending the IPv6 packet to the next-hop device.

In the foregoing technical solution, the threshold greater than or equal to 2 may be configured on the first network device (a device that supports multicast forwarding based on the unicast destination address of the IPv6 packet), and the first network device avoids forwarding the IPv6 packet when checking that a hop limit in the packet is less than or equal to the threshold before forwarding the IPv6 packet. In this way, a probability that ICMPv6 error packets are generated on the first network device because a value of the IPv6 hop limit is 1 or 0 can be reduced, so that security of IPv6 packet forwarding can be improved, and a waste of network bandwidth and a waste of bandwidth of an attacked device that are caused by a plurality of or even a large quantity of ICMPv6 error packets can be avoided.

Optionally, in some embodiments, after the first network device avoids forwarding the IPv6 packet, the first network device may further discard the IPv6 packet.

Optionally, in some embodiments, when the first network device determines that the value of the hop limit field in the IPv6 packet is greater than the threshold and the inner packet is the multicast packet, the first network device may forward the IPv6 packet.

For example, if the first network device is an intermediate forwarding device, the first network device sends the IPv6 packet to a second network device, and the second network device forwards the second IPv6 packet to a third network device, where a destination address of the second IPv6 packet is an address of the third network device.

Alternatively, in another example, if the first network device is an egress device, the first network device decapsulates the IPv6 packet, and forwards an inner packet obtained after the IPv6 packet is decapsulated.

Optionally, in some embodiments, on a premise of considering how to support OAM, security of IPv6 packet forwarding can also be improved, and a waste of network bandwidth and a waste of bandwidth of an attacked device that are caused by a plurality of or even a large quantity of ICMPv6 error packets can also be avoided; or it can also be ensured that an OAM detection function is not affected while security of IPv6 packet transmission is improved. In this implementation, a possible format of an IPv6 packet encapsulated by R1 is: an outer IPv6 header+an OAM packet. The OAM packet may be an IP-encapsulated OAM packet, and includes an inner IPv6 header, a UDP header, and an OAM header. The inner IPv6 header, the UDP header, and the OAM header together form an Echo Request packet in this embodiment of this application.

That is, in this embodiment, the Echo Request packet itself includes the IPv6 header, the UDP header, and the OAM header, and the Echo Request packet is encapsulated in the outer IPv6 header, so that the Echo Request packet performs point-to-multipoint (P2MP) forwarding based on the outer IPv6 header.

It should be understood that, a destination address of the inner IPv6 header is a valid IPv6 address that can be identified by a network device. Specifically, the foregoing valid IPv6 address that can be identified may be any one in a range of 0:0:0:0:0:FFFF:7F00:0/104.

In a possible implementation, the first network device avoids forwarding the IPv6 packet if a transmission rate of the IPv6 packet is greater than a preset rate when the inner packet of the IPv6 packet is an OAM packet. Optionally, the first network device may further discard the IPv6 packet.

In another possible implementation, the first network device forwards the IPv6 packet if the transmission rate of the IPv6 packet is less than or equal to the preset rate when the inner multicast packet of the IPv6 packet is the OAM packet. It should be understood that, a packet transmission rate may be a quantity of packets transmitted per second (pps), or may be a quantity of bits transmitted per second (bps).

By using an example in which a hop limit threshold is configured on R3 in FIG. 1, the following describes a specific implementation process of the IPv6 packet sending method provided in this embodiment of this application in detail with reference to FIG. 3.

It should be understood that, the example in FIG. 3 is merely intended to help a person skilled in the art understand this embodiment of this application, but is not intended to limit this embodiment of this application to a specific value or a specific scenario. A person skilled in the art can clearly make various equivalent modifications or changes according to the example provided in FIG. 3 below, and such modifications or changes also fall within the scope of the embodiments of this application.

FIG. 3 is a schematic flowchart of another IPv6 packet sending method according to an embodiment of this application. As shown in FIG. 3, the method may include step 310 to step 375. Step 310 to step 375 are respectively described below in detail.

It should be understood that, in FIG. 3, an example in which the hop limit threshold configured on R3 is 3 is used for description.

The following lists a possible case.

Step 310: R3 receives an encapsulated IPv6 packet, where in an outer IPv6 header of the encapsulated IPv6 packet: source address (SA)=R1, DA=R3, and hop limit=3, and a user multicast packet following the outer IPv6 header is an IPv4 multicast packet.

Step 315: R3 avoids forwarding the IPv6 packet in step 310.

Because R3 determines that the hop limit of the outer IPv6 header is equal to the threshold and the user multicast packet is the IPv4 multicast packet, R3 may avoid forwarding the foregoing encapsulated IPv6 packet. For a specific manner of determining the user multicast packet, refer to the foregoing description. Details are not described herein again.

It should be understood that, in this application, avoiding forwarding the encapsulated IPv6 packet may be considered as preventing the encapsulated IPv6 packet from being sent to a next-hop device, or may be considered as skipping forwarding the encapsulated IPv6 packet. That is, avoiding forwarding the encapsulated IPv6 packet may be understood as not sending the encapsulated IPv6 packet to the next-hop device.

Optionally, in some embodiments, R3 may further discard the foregoing encapsulated IPv6 packet.

The following lists another possible case.

Step 320: R3 receives an encapsulated IPv6 packet, where in an outer IPv6 header of the encapsulated IPv6 packet: SA=R1, DA=R3, and hop limit=3, and a user multicast packet following the outer IPv6 header is an IPv6 packet.

Step 325: R3 avoids forwarding the IPv6 packet in step 320.

Because R3 determines that the hop limit of the outer IPv6 header is equal to the threshold and the user multicast packet is the IPv6 multicast packet, R3 may avoid forwarding the foregoing encapsulated IPv6 packet. For a specific manner of determining the user multicast packet, refer to the foregoing description. Details are not described herein again.

Optionally, in some embodiments, R3 may further discard the foregoing encapsulated IPv6 packet.

The following lists another possible case.

Step 330: R3 receives an encapsulated IPv6 packet, where in an outer IPv6 header of the encapsulated IPv6 packet: SA=R1, DA=R3, and hop limit=3, and a user multicast packet following the outer IPv6 header is an ethernet packet.

Step 335: R3 avoids forwarding the IPv6 packet in step 330.

Because R3 determines that the hop limit of the outer IPv6 header is equal to the threshold and the user multicast packet is the ethernet packet, R3 may avoid forwarding the foregoing encapsulated IPv6 packet. For a specific manner of determining the user multicast packet, refer to the foregoing description. Details are not described herein again.

Optionally, in some embodiments, R3 may further discard the foregoing encapsulated IPv6 packet.

The following lists another possible case.

Step 340: R3 receives an encapsulated IPv6 packet, where in an outer IPv6 header of the encapsulated IPv6 packet: SA=R1, DA=R3, and hop limit=3, and a user multicast packet following the outer IPv6 header is an OAM packet.

Step 345: R3 forwards an IPv6 packet whose transmission rate does not exceed a rate limit in step 340 to R6.

Because R3 determines that the hop limit of the outer IPv6 header is equal to the threshold and determines that the user multicast packet is the OAM packet, rate limiting is performed on the packet to avoid forwarding a packet whose rate exceeds the rate limit, and a packet whose rate does not exceed the rate limit is forwarded.

Specifically, in a possible implementation, R3 may determine that the user multicast packet is the OAM packet by excluding that the user multicast packet is not an IPv4 multicast packet, an IPv6 multicast packet, or an ethernet packet. Based on a value 41 of a next header of the outer IPv6 header, R3 excludes a possibility that the user multicast packet is the IPv4 multicast packet or the ethernet packet because the IPv4 multicast packet or the ethernet packet corresponds to a value 4 or 143 of a next header respectively. R3 may further check that first 8 bits of a destination address of an inner user multicast packet are not equal to oxff, or the first 8 bits of the destination address are equal to 0, or first 104 bits of the destination address are 0:0:0:0:0:FFFF:7F00 (that is, the destination address is an address in an address segment 0:0:0:0:0:FFFF:7F00:0/104), so that R3 determines that the inner user multicast packet is not an IPv6 packet.

If the user multicast packet is the OAM packet and the transmission rate of the packet does not exceed the rate limit, R3 forwards the packet to R5 along a P2MP path. In an outer IPv6 header of the packet sent to R5: SA=R1, DA=R6, and hop limit=2.

Step 350: R6 decapsulates the encapsulated IPv6 packet received from step 350, and sends a response packet to an SA (SA=R1).

As an egress node, R6 determines, after decapsulating the IPv6 packet, that the inner user multicast packet is the OAM packet, and R6 sends the response packet to the SA (SA=R1) in the outer IPv6 header.

As an example, the response packet is an Echo Reply OAM packet.

Step 355: R3 forwards an IPv6 packet whose transmission rate does not exceed the rate limit in step 340 to R5.

If the user multicast packet is the OAM packet and the transmission rate of the packet does not exceed the rate limit, R3 forwards the packet to R6 along the P2MP path. In an outer IPv6 header of the packet sent to R6: SA=R1, DA=R5, and hop limit=2.

Step 360: R5 forwards the packet in which the hop limit is 2 and the user multicast packet is the OAM packet that is received from step 355 to R7.

Assuming that a hop limit threshold is not configured on R5, R5 forwards the received packet in which the hop limit is 2 and the user multicast packet is the OAM packet to R7. In an outer IPv6 header of the packet sent to R7: SA=R1, DA=R7, and hop limit=1.

Step 365: R7 decapsulates the encapsulated IPv6 packet received from step 360, and sends a response packet to an SA (SA=R1).

As an egress node, R7 determines, after decapsulating the IPv6 packet, that the inner user multicast packet is the OAM packet, and R7 sends the response packet to the SA (SA=R1) in the outer IPv6 header.

Step 370: R5 forwards the packet in which the hop limit is 2 and the user multicast packet is the OAM packet that is received from step 355 to R8.

Assuming that a hop limit threshold is not configured on R5, R5 forwards the received packet in which the hop limit is 2 and the user multicast packet is the OAM packet to R8. In an outer IPv6 header of the packet sent to R8: SA=R1, DA=R8, and hop limit=1.

Step 475: R8 decapsulates the encapsulated IPv6 packet received from step 370, and sends a response packet to an SA (SA=R1).

As an egress node, R8 determines, after decapsulating the IPv6 packet, that the inner user multicast packet is the OAM packet, and R8 sends the response packet to the SA (SA=R1) in the outer IPv6 header.

In the foregoing technical solution, for a scenario in which multicast data packet forwarding is performed based on an IPv6 unicast address, a hop limit threshold greater than or equal to 2 may be set on a device. During forwarding, if a packet to be forwarded is a multicast data packet and a value of a hop limit in the packet is less than or equal to the threshold, forwarding is avoided, so that ICMPv6 error packets are prevented from being generated when the multicast data packet is sent to some intermediate nodes, thereby reducing a possibility that the device is attacked by a network. Forwarding of a normal multicast data packet is not affected as long as a hop limit is not less than the set threshold. In addition, this application also considers support of an OAM function such as Ping or Traceroute. Because Ping/Traceroute usually does not require a very high rate, and for a received packet in which a hop limit is less than or equal to the threshold but greater than 1, it is determined that the packet is not the multicast data packet, rate limiting forwarding is performed, so that the Ping/Traceroute function can be normally performed. In addition, a packet whose rate exceeds the rate limit avoids being forwarded, which prevents an attacker from forging a Ping/Traceroute packet or another non-multicast data packet to launch an attack.

In some embodiments, there are two hop limit transmission modes: a Uniform mode and a Pipe mode respectively. Detailed descriptions are provided below with reference to FIG. 4 and FIG. 6.

Figure 4:
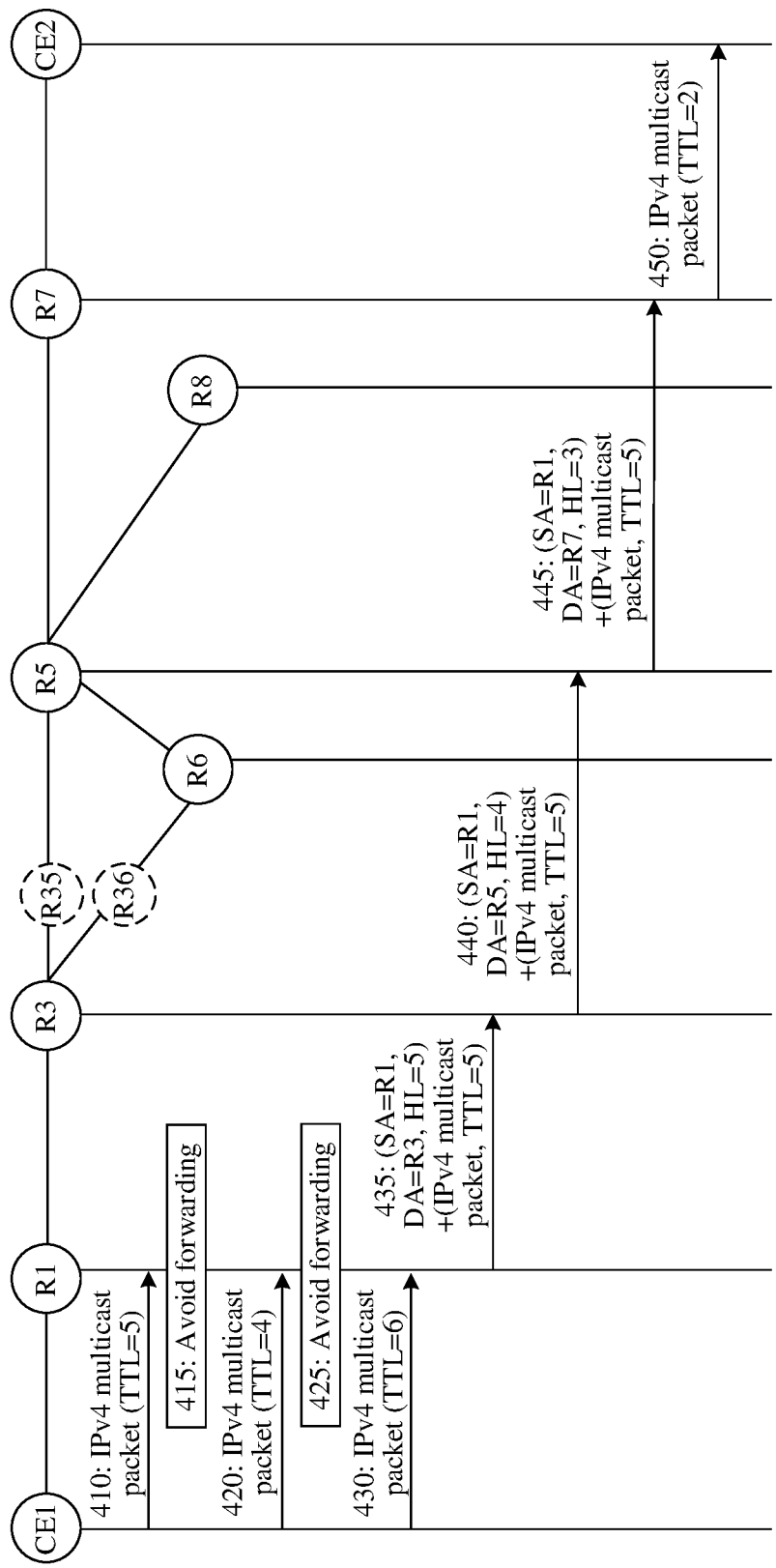
FIG. 4 is a schematic flowchart of another IPv6 packet sending method according to an embodiment of this application.

By using an example in which a hop limit threshold is configured on R1 in FIG. 1 and a hop limit transmission mode of R1 is a Uniform mode, the following describes a specific implementation process in which a device in this embodiment of this application performs multicast forwarding based on an IPv6 unicast address in detail with reference to FIG. 4.

It should be understood that the example in FIG. 4 is merely intended to help a person skilled in the art understand this embodiment of this application, but is not intended to limit this embodiment of this application to a specific value or a specific scenario in the example. A person skilled in the art can clearly make various equivalent modifications or changes according to the example provided in FIG. 4 below, and such modifications or changes also fall within the scope of embodiments of this application.

FIG. 4 is a schematic flowchart of another IPv6 packet sending method according to an embodiment of this application. As shown in FIG. 4, the method may include step 410 to step 450. Step 410 to step 450 are respectively described below in detail.

It should be understood that, in FIG. 4, an example in which the hop limit threshold configured on R1 is 5 and the hop limit transmission mode of R1 is the Uniform mode is used for description.

It should be noted that, for ease of description, an IPv4 multicast data packet is used as an example for description in FIG. 4. For an IPv6 multicast data packet, the same processing manner is also used. An HL field of the IPv6 multicast data packet corresponds to a TTL of the IPv4 multicast data packet.

The following lists a possible case.

Step 410: R1 receives an IPv4 multicast data packet sent by a customer edge device 1 (CE1), and a time to live (TTL) of the packet is 5.

Step 415: R1 avoids encapsulating the IPv4 multicast data packet in step 410.

The TTL of the IPv4 multicast data packet corresponds to the hop limit of the IPv6 multicast data packet, the hop limit threshold configured on R1 is 5, and the TTL of the IPv4 multicast data packet received by R1 is 5 (the TTL is equal to the hop limit threshold). Therefore, R1 avoids encapsulating the IPv4 multicast data packet, and does not perform multicast forwarding on the IPv4 multicast data packet.

Optionally, in some embodiments, R1 discards the IPv4 multicast data packet.

The following lists another possible case.

Step 420: R1 receives an IPv4 multicast data packet sent by CE1, and a TTL of the packet is 4.

Step 425: R1 avoids encapsulating the IPv4 multicast data packet in step 420.

The TTL of the IPv4 multicast data packet corresponds to the hop limit of the IPv6 multicast data packet, the hop limit threshold configured on R1 is 5, and the TTL of the IPv4 multicast data packet received by R1 is 4 (the TTL is less than the hop limit threshold). Therefore, R1 avoids encapsulating the IPv4 multicast data packet, and does not perform multicast forwarding on the IPv4 multicast data packet.

Optionally, in some embodiments, R1 discards the IPv4 multicast data packet.

The following lists another possible case.

Step 430: R1 receives an IPv4 multicast data packet sent by a customer edge device 1 (CE1), and a time to live (TTL) of the packet is 6.

Step 435: R1 encapsulates the IPv4 multicast data packet whose TTL is 6 in step 430, and sends the packet to R3.

The TTL of the IPv4 multicast data packet corresponds to the hop limit of the IPv6 multicast data packet, the hop limit threshold configured on R1 is 5, and the TTL is greater than the hop limit threshold. Therefore, R1 encapsulates the IPv4 multicast data packet and sends the packet to R3.

As an example, R1 encapsulates an outer IPv6 header to the IPv4 multicast data packet, subtracts a value of the TTL of the IPv4 multicast data packet by one based on processing of the Uniform mode, and uses a value obtained after the value of the TTL is subtracted by one as a value of a hop limit field of the outer IPv6 header. Therefore, in the outer IPv6 header of an IPv6 packet sent by R1 to R3: SA=R1, DA=R3, and hop limit=5, and the TTL of the inner IPv4 multicast data packet=5.

Step 440: R3 sends the encapsulated IPv6 packet to R5.

In the outer IPv6 header of the IPv6 packet sent by R3 to R5: SA=R1, DA=R5, and hop limit=4, and the TTL of the inner IPv4 multicast data packet is 5.

Step 445: R5 sends the IPv6 packet to R7.

In the outer IPv6 header of the IPv6 packet sent by R5 to R7: SA=R1, DA=R7, and hop limit=3, and the TTL of the inner IPv4 multicast data packet is 5.

Step 450: R7 sends the inner IPv4 multicast data packet to CE2.

In the outer IPv6 header of the IPv6 packet received by R7: SA=R1, DA=R7, and hop limit=3, and the TTL of the inner IPv4 multicast data packet=5. Assuming that a hop limit transmission mode of R7 is the Uniform mode, R7 subtracts a value of the HL by one and assigns the value to the TTL of the inner IPv4 multicast data packet. Therefore, the value of the TTL of the IPv4 multicast data packet sent by R7 to CE2 is 2.

Figure 5:
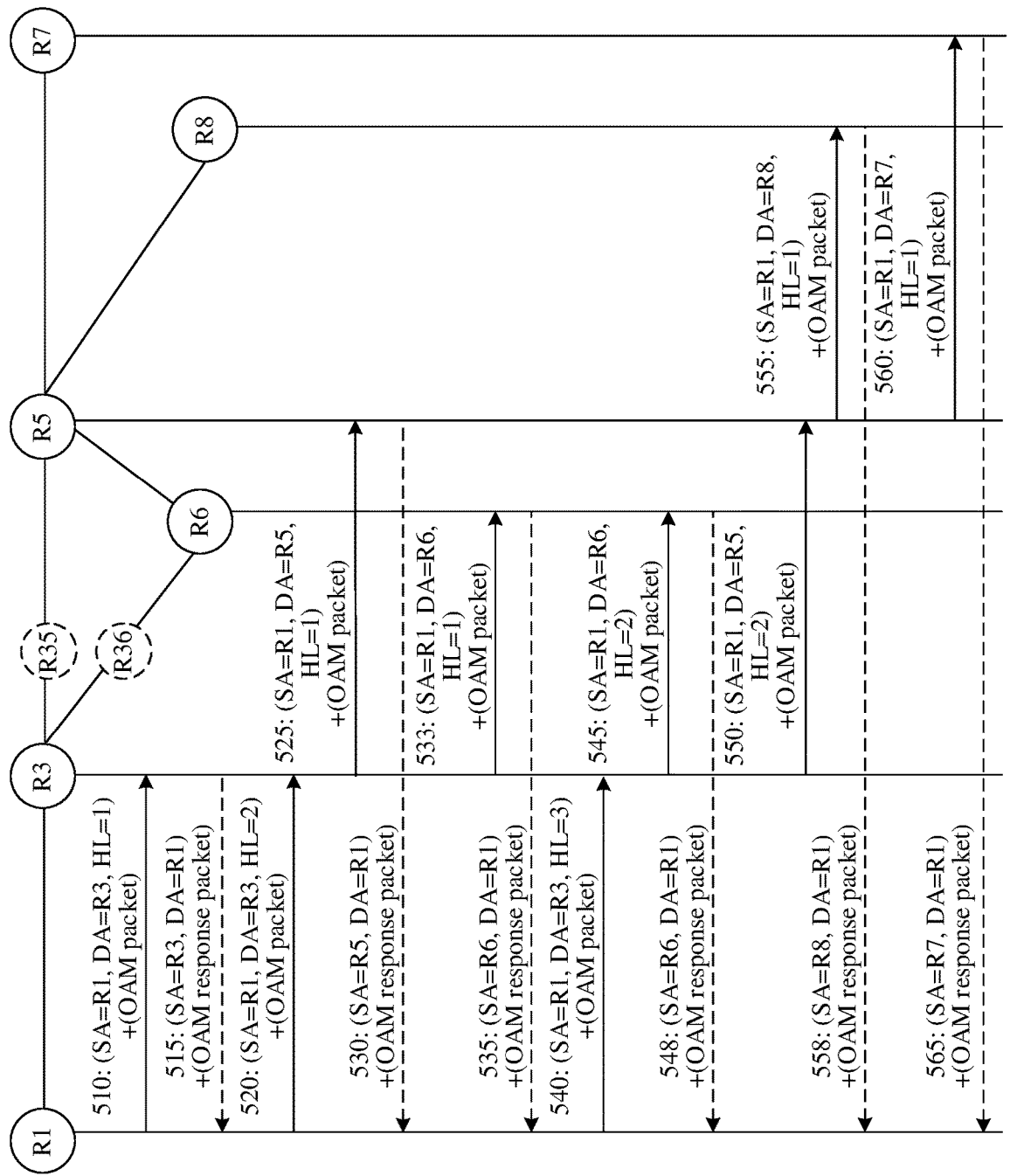
FIG. 5 is a schematic flowchart of another IPv6 packet sending method according to an embodiment of this application.

By using an example in which a hop limit threshold is configured on a plurality of devices in FIG. 1 and a hop limit transmission mode of R1 is a Uniform mode, the following describes a specific implementation process in which a device in this embodiment of this application performs multicast forwarding based on an IPv6 unicast address in detail with reference to FIG. 5.

It should be understood that, the example in FIG. 5 is merely intended to help a person skilled in the art understand this embodiment of this application, but is not intended to limit this embodiment of this application to a specific value or a specific scenario in the example. A person skilled in the art can clearly make various equivalent modifications or changes according to the example provided in FIG. 5 below, and such modifications or changes also fall within the scope of embodiments of this application.

FIG. 5 is a schematic flowchart of another IPv6 packet sending method according to an embodiment of this application. As shown in FIG. 5, the method may include step 510 to step 565. Step 510 to step 565 are respectively described below in detail.

It should be understood that, in FIG. 5, an example in which a hop limit threshold set on R1 is 5, the hop limit transmission mode of R1 is the Uniform mode, and hop limit thresholds are also set on other devices R3/R5/R7/R8 respectively is used for description.

It should be noted that, the hop limit thresholds set on the devices R3/R5/R7/R8 may be the same, or may be different. For ease of description, in FIG. 5, an example in which all the hop limit thresholds set on R3/R5/R7/R8 are 3 is used for description.

The following lists a possible case: R1 initiates a first round of detection and uses HL=1 to construct an Echo Request OAM packet.

Step 510: R1 sends an encapsulated IPv6 packet to R3, where an inner layer of the IPv6 packet is an OAM packet.

In an outer IPv6 header of the IPv6 packet constructed by R1: SA=R1, DA=R3, and hop limit=1. Although hop limit=1 that is less than the hop limit threshold (the threshold=5) configured on R1, R1 performs rate limiting forwarding because an inner user multicast packet is the OAM packet. The packet is allowed to be forwarded to R3 when a rate thereof is within a limit.

Step 615: R3 feeds back a response packet to R1.

In the outer IPv6 header of the IPv6 packet received by R3 from R1: SA=R1, DA=R3, and hop limit=1, and the inner user multicast packet is the OAM packet. Because hop limit=1 and the inner user multicast packet is the OAM packet, R3 sends the response packet to an SA (SA=R1) in the outer IPv6 header, and does not forward the packet to R5 and R6. The first round of detection ends.

As an example, the response packet is an Echo Reply OAM packet.

The following lists another possible case: R1 initiates a second round of detection and uses HL=2 to construct an Echo Request OAM packet.

Step 520: R1 sends an encapsulated IPv6 packet to R3, where an inner layer of the IPv6 packet is an OAM packet.

In an outer IPv6 header of the IPv6 packet sent by R1 to R3: SA=R1, DA=R3, and hop limit=2, and an inner user multicast packet is the OAM packet.

Step 525: R3 sends an encapsulated IPv6 packet to R5, where an inner layer of the IPv6 packet is an OAM packet.

In an outer IPv6 header of the IPv6 packet sent by R3 to R5: SA=R1, DA=R5, and hop limit=2, and an inner user multicast packet is the OAM packet. Although hop limit=1 that is less than the hop limit threshold (the threshold=3) configured on R3, R3 performs rate limiting forwarding because the inner user multicast packet is the OAM packet. The packet is allowed to be forwarded to R5 when a rate thereof is within a limit.

Step 530: R5 feeds back a response packet to R1.

In the outer IPv6 header of the IPv6 packet received by R5 from R3: hop limit=1, and the inner user multicast packet is the OAM packet. Although the hop limit threshold configured on R3 is 3, R5 does not directly discard the packet because of the OAM packet. In addition, because hop limit=1 in the outer IPv6 header, R5 sends the response packet to an SA (SA=R1) in the outer IPv6 header, but does not forward the packet to R7 and R8. The second round of detection ends.

Step 533: R3 sends an encapsulated IPv6 packet to R6, where an inner layer of the IPv6 packet is an OAM packet.

In an outer IPv6 header of the IPv6 packet sent by R3 to R6: SA=R1, DA=R6, and hop limit=2, and an inner user multicast packet is the OAM packet. Although hop limit=1 that is less than the hop limit threshold (the threshold=3) configured on R3, R3 performs rate limiting forwarding because the inner user multicast packet is the OAM packet. The packet is allowed to be forwarded to R6 when a rate thereof is within a limit.

Step 535: R6 feeds back a response packet to R1.

Because R6 is an egress node and the hop limit received by R6=1, R6 sends the response packet to the SA (SA=R1) in the outer IPv6 header. The second round of detection ends.

The following lists another possible case: R1 initiates a second round of detection and uses HL=3 to construct an Echo Request OAM packet.

Step 540: R1 sends an encapsulated IPv6 packet to R3, where an inner layer of the IPv6 packet is an OAM packet.

In an outer IPv6 header of the IPv6 packet sent by R1 to R3: SA=R1, DA=R3, and hop limit=3, and an inner user multicast packet is the OAM packet.

Step 545: R3 sends an encapsulated IPv6 packet to R6, where an inner layer of the IPv6 packet is an OAM packet.

In an outer IPv6 header of the IPv6 packet sent by R3 to R6: SA=R1, DA=R6, and hop limit=2, and an inner user multicast packet is the OAM packet.

Step 548: R6 feeds back a response packet to R1.

In the outer IPv6 header of the IPv6 packet received by R6 from R3: hop limit=2, and the inner user multicast packet is the OAM packet. Although the hop limit threshold configured on R6 is 3, R6 does not directly discard the packet because of the OAM packet. In addition, because R6 is an egress node, R6 sends the response packet to an SA (SA=R1) in the outer IPv6 header. The third round of detection ends.

Step 550: In an outer IPv6 header of an IPv6 packet sent by R3 to R5: SA=R1, DA=R5, and hop limit=2, and an inner user multicast packet is an OAM packet.

Step 555: R5 sends an encapsulated IPv6 packet to R8, where an inner layer of the IPv6 packet is an OAM packet.

In an outer IPv6 header of the IPv6 packet sent by R5 to R8: SA=R1, DA=R8, and hop limit=1, and an inner user multicast packet is the OAM packet.

Step 558: R8 feeds back a response packet to R1.

Because R8 is an egress node, R8 sends the response packet to the SA (SA=R1) in the outer IPv6 header. The third round of detection ends. For details, refer to description in step 660. Details are not described herein again.

Step 560: R5 sends an encapsulated IPv6 packet to R7, where an inner layer of the IPv6 packet is an OAM packet.

In an outer IPv6 header of the IPv6 packet sent by R5 to R7: SA=R1, DA=R7, and hop limit=1, and an inner user multicast packet is the OAM packet.

Step 565: R7 feeds back a response packet to R1.

In the outer IPv6 header of the IPv6 packet received by R7 from R5: hop limit=1, and the inner user multicast packet is the OAM packet. Although the hop limit threshold configured on R7 is 3, R7 does not directly discard the packet because of the OAM packet. In addition, because hop limit=1 in the outer IPv6 header, R7 sends a response packet 7 to the SA (SA=R1) in the outer IPv6 header. The third round of detection ends.

Figure 6:
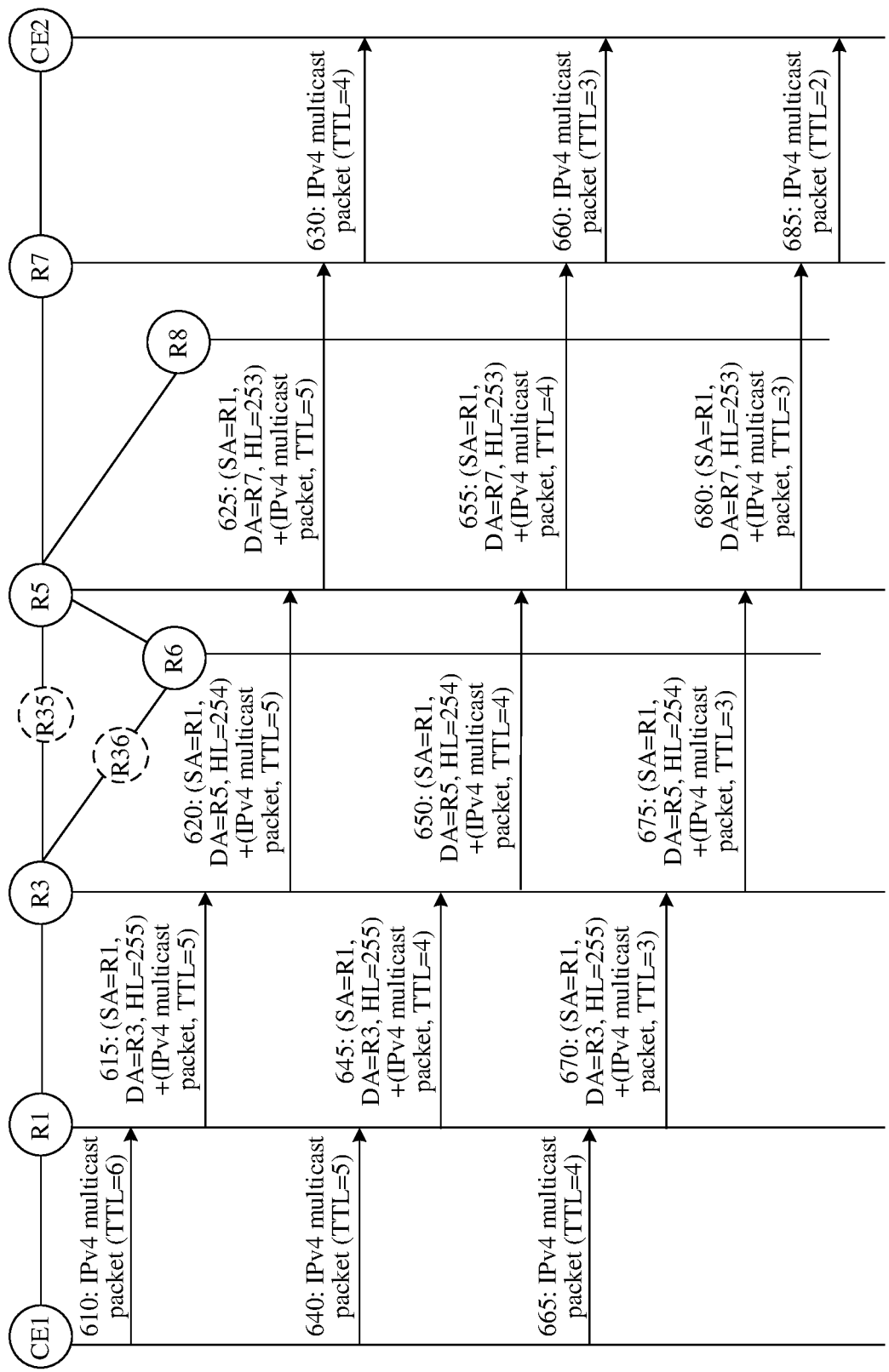
FIG. 6 is a schematic flowchart of another IPv6 packet sending method according to an embodiment of this application.

By using an example in which a hop limit threshold is configured on R1 in FIG. 1 and a hop limit transmission mode of R1 is a Pipe mode, the following describes a specific implementation process in which a device in this embodiment of this application performs multicast forwarding based on an IPv6 unicast address in detail with reference to FIG. 6.

It should be understood that, the example in FIG. 6 is merely intended to help a person skilled in the art understand this embodiment of this application, but is not intended to limit this embodiment of this application to a specific value or a specific scenario in the example. A person skilled in the art can clearly make various equivalent modifications or changes according to the example provided in FIG. 6 below, and such modifications or changes also fall within the scope of the embodiments of this application.

FIG. 6 is a schematic flowchart of another IPv6 packet sending method according to an embodiment of this application. As shown in FIG. 6, the method may include step 61o to step 685. Step 61o to step 685 are respectively described below in detail.

It should be understood that, in FIG. 6, an example in which the hop limit threshold set on R1 is 5 is used for description.

It should be noted that, for ease of description, an IPv4 multicast data packet is used as an example for description in FIG. 6. For an IPv6 multicast data packet, the same processing is also used. An HL field of the IPv6 multicast data packet corresponds to a TTL of the IPv4 multicast data packet.

The following lists a possible case.

Step 610: R1 receives an IPv4 multicast data packet sent by CE1, and a time to live (TTL) of the packet is 6.

Step 615: R1 encapsulates the IPv4 multicast data packet in step 610, and forwards the packet to R3.

The TTL of the IPv4 multicast data packet corresponds to the hop limit of the IPv6 multicast data packet, the hop limit threshold configured on R1 is 5, and the TTL of the IPv4 multicast data packet received by R1 is 6 (the TTL is greater than the hop limit threshold). Therefore, R1 may encapsulate the IPv4 multicast data packet, and forward the packet to R3.

Specifically, during forwarding, R1 encapsulates an outer IPv6 header to the IPv4 multicast data packet based on Pipe processing, and sets a hop limit of the outer IPv6 header to 255. Therefore, in the outer IPv6 header of an IPv6 packet sent by R1 to R3: SA=R1, DA=R3, and hop limit=255, and the TTL of the inner IPv4 multicast data packet=5.

Step 620: R3 forwards the packet received from R1 to R5.

In the outer IPv6 header of the IPv6 packet sent by R3 to R5: SA=R1, DA=R5, and hop limit=254, and the TTL of the inner IPv4 multicast data packet=5.

Step 625: R5 forwards the packet received from R3 to R7.

In the outer IPv6 header of the IPv6 packet sent by R5 to R7: SA=R1, DA=R7, and hop limit=253, and the TTL of the inner IPv4 multicast data packet=5.

Step 630: R7 sends the inner IPv4 multicast data packet to CE2.

In the outer IPv6 header of the IPv6 packet received by R7: SA=R1, DA=R7, and hop limit=253, and the TTL of the inner IPv4 multicast data packet=5. Assuming that a hop limit transmission mode of R7 is the Pipe mode, R7 removes the outer IPv6 header and subtracts the value of the TTL field of the inner IPv4 multicast data packet by one. Therefore, the value of the TTL of the packet sent by R7 to CE2 is 4.

The following lists another possible case.

Step 640: R1 receives an IPv4 multicast data packet sent by CE1, and a time to live (TTL) of the packet is 5.

Step 645: R1 encapsulates the IPv4 multicast data packet in step 640, and forwards the packet to R3.

The TTL of the IPv4 multicast data packet corresponds to the hop limit of the IPv6 multicast data packet, the hop limit threshold configured on R1 is 5, and the TTL of the IPv4 multicast data packet received by R1 is 5 (the TTL is equal to the hop limit threshold). Therefore, R1 may encapsulate the IPv4 multicast data packet based on Pipe processing, and forward the packet to R3.

Specifically, during forwarding, R1 encapsulates an outer IPv6 header to the IPv4 multicast data packet based on the Pipe processing, and sets a hop limit of the outer IPv6 header to 255. Therefore, in the outer IPv6 header of an IPv6 packet sent by R1 to R3: SA=R1, DA=R3, and hop limit=255, and the TTL of the inner IPv4 multicast data packet=4.

Step 650: R3 forwards the packet received from R1 to R5.

In the outer IPv6 header of the IPv6 packet sent by R3 to R5: SA=R1, DA=R5, and hop limit=254, and the TTL of the inner IPv4 multicast data packet=4.

Step 655: R5 forwards the packet received from R3 to R7.

In the outer IPv6 header of the IPv6 packet sent by R5 to R7: SA=R1, DA=R7, and hop limit=253, and the TTL of the inner IPv4 multicast data packet=4.

Step 660: R7 sends the inner IPv4 multicast data packet to CE2.

In the outer IPv6 header of the IPv6 packet received by R7: SA=R1, DA=R7, and hop limit=253, and the TTL of the inner IPv4 multicast data packet=4. Assuming that a hop limit transmission mode of R7 is the Pipe mode, R7 removes the outer IPv6 header and subtracts the value of the TTL field of the inner IPv4 multicast data packet by one. Therefore, the value of the TTL of the packet sent by R7 to CE2 is 3.

The following lists another possible case.

Step 665: R1 receives an IPv4 multicast data packet sent by CE1, and a time to live (TTL) of the packet is 4.

Step 670: R1 encapsulates the IPv4 multicast data packet in step 665, and forwards the packet to R3.

The TTL of the IPv4 multicast data packet corresponds to the hop limit of the IPv6 multicast data packet, the hop limit threshold configured on R1 is 4, and the TTL of the IPv4 multicast data packet received by R1 is 5 (the TTL is less than the hop limit threshold). Therefore, R1 may encapsulate the IPv4 multicast data packet based on Pipe processing, and forward the packet to R3.

Specifically, during forwarding, R1 encapsulates an outer IPv6 header to the IPv4 multicast data packet based on the Pipe processing, and sets a hop limit of the outer IPv6 header to 255. Therefore, in the outer IPv6 header of an IPv6 packet sent by R1 to R3: SA=R1, DA=R3, and hop limit=255, and the TTL of the inner IPv4 multicast data packet=3.

Step 675: R3 forwards the packet received from R1 to R5.

In the outer IPv6 header of the IPv6 packet sent by R3 to R5: SA=R1, DA=R5, and hop limit=254, and the TTL of the inner IPv4 multicast data packet=3.

Step 680: R5 forwards the packet received from R3 to R7.

In the outer IPv6 header of the IPv6 packet sent by R5 to R7: SA=R1, DA=R7, and hop limit=253, and the TTL of the inner IPv4 multicast data packet=3.

Step 685: R7 sends the inner IPv4 multicast data packet to CE2.

In the outer IPv6 header of the IPv6 packet received by R7: SA=R1, DA=R7, and hop limit=253, and the TTL of the inner IPv4 multicast data packet=3. Assuming that a hop limit transmission mode of R7 is the Pipe mode, R7 removes the outer IPv6 header and subtracts the value of the TTL field of the inner IPv4 multicast data packet by one. Therefore, the value of the TTL of the packet sent by R7 to CE2 is 2.

An IPv6 packet sending method provided in the embodiments of this application is described above in detail with reference to FIG. 1 to FIG. 6, and apparatus embodiments of this application are described below in detail with reference to FIG. 7 to FIG. 9. It should be understood that, the descriptions of the method embodiments correspond to descriptions of the apparatus embodiments. Therefore, for parts that are not described in detail, refer to the descriptions in the foregoing method embodiments.

Figure 7:
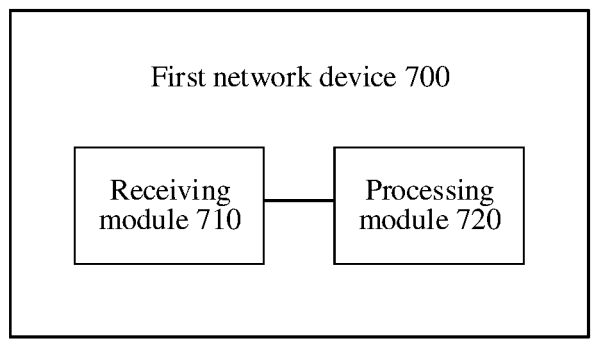
FIG. 7 is a schematic diagram of a structure of a first network device 700 according to an embodiment of this application.

FIG. 7 is a schematic diagram of a structure of a first network device 700 according to an embodiment of this application. The first network device 700 shown in FIG. 7 may perform corresponding steps performed by the first network device in the method of the foregoing embodiments. As shown in FIG. 7, the first network device 700 includes a receiving module 710 and a processing module 720.

The receiving module 710 is configured to receive a first IPv6 packet, where the first IPv6 packet includes a packet header and an inner packet, and the packet header includes a hop limit hop limit field.

The processing module 720 is configured to determine whether a value of the hop limit field in the first IPv6 packet is less than or equal to a preset threshold on the first network device, where the preset threshold is a number greater than or equal to 2.

The processing module 720 is further configured to determine whether the inner packet is a multicast packet.

The processing module 720 is further configured to avoid forwarding the first IPv6 packet when the value of the hop limit field in the first IPv6 packet is less than or equal to the preset threshold and the inner packet is the multicast packet.

Optionally, the processing module 720 is further configured to: discard the first IPv6 packet.

Optionally, the preset threshold is a threshold determined based on a quantity of one or more consecutive second network devices connected to the first network device, the second network device is a network device that performs unicast forwarding based on a destination address of an IPv6 packet received from the first network device, and the destination address of the IPv6 packet received from the first network device is different from an address of the second network device.

Optionally, the receiving module 710 is further configured to receive a second IPv6 packet, where the second IPv6 packet includes a packet header and an inner packet, and the packet header includes a hop limit field.

The processing module 720 is further configured to determine whether a value of the hop limit field in the second IPv6 packet is less than or equal to the preset threshold.

The processing module 720 is further configured to determine whether the inner packet of the second IPv6 packet is the multicast packet.

The processing module 720 is further configured to process the second IPv6 packet when the value of the hop limit field in the second IPv6 packet is greater than the preset threshold and the inner packet of the second IPv6 packet is the multicast packet.

Optionally, the processing module 720 is specifically configured to: send, if the first network device is an intermediate forwarding device, the second IPv6 packet to a second network device, and forward, by the second network device, the second IPv6 packet to a third network device, where a destination address of the second IPv6 packet is an address of the third network device; or decapsulate, if the first network device is an egress device, the second IPv6 packet, and forward the inner packet obtained after the second IPv6 packet is decapsulated.

Optionally, the multicast packet includes any one of the following: an IPv6 multicast packet, an internet protocol version 4 IPv4 multicast packet, or an ethernet packet.

Optionally, the hop limit field in the first IPv6 packet is less than or equal to the preset threshold, and the processing module is further configured to: avoid forwarding the IPv6 packet if a transmission rate of the first IPv6 packet is greater than a preset rate when the inner packet of the first IPv6 packet is an operation administration and maintenance OAM packet.

Optionally, the processing module 720 is further configured to: discard the first IPv6 packet.

Optionally, the hop limit field in the first IPv6 packet is less than or equal to the preset threshold, and the processing module is further configured to: forward the first IPv6 packet if the transmission rate of the first IPv6 packet is less than or equal to the preset rate when the inner multicast packet is the OAM packet.

Figure 8:
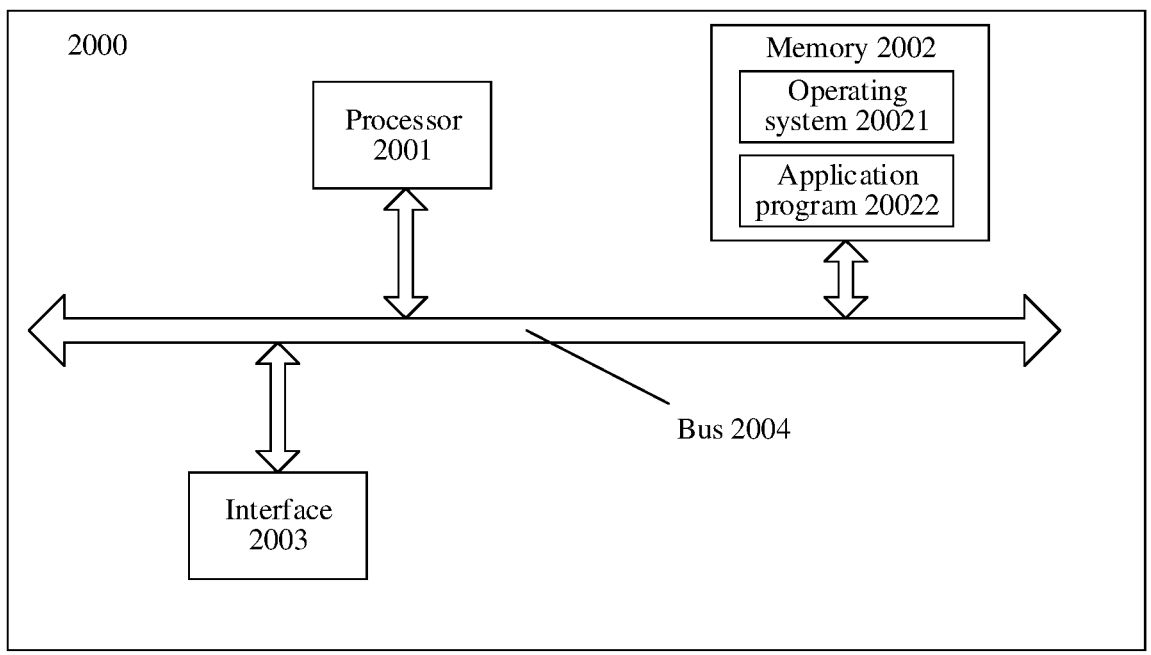
FIG. 8 is a schematic diagram of a hardware structure of a first network device 2000 according to an embodiment of this application.

FIG. 8 is a schematic diagram of a hardware structure of a first network device 2000 according to an embodiment of this application; and The first network device 2000 shown in FIG. 8 may perform corresponding steps performed by the first network device in the method of the foregoing embodiments.

As shown in FIG. 8, the first network device 2000 includes a processor 2001, a memory 2002, an interface 2003, and a bus 2004. The interface 2003 may be implemented in a wireless or wired manner, and may be specifically a network adapter. The processor 2001, the memory 2002, and the interface 2003 are connected through the bus 2004.

The interface 2003 may specifically include a transmitter and a receiver, and is configured to enable the first network device to implement the foregoing receiving and sending. For example, the interface 2003 is configured to receive an IPv6 packet.

The processor 2001 is configured to perform processing performed by the first network device in the foregoing embodiments. For example, the processor is configured to determine whether a value of the hop limit field in the first IPv6 packet is less than or equal to a preset threshold on the first network device; further configured to determine whether the inner packet is a multicast packet; further configured to avoid, by the first network device, forwarding the first IPv6 packet when the value of the hop limit field in the first IPv6 packet is less than or equal to the preset threshold and the inner packet is the multicast packet; and/or used in another process in the technology described in this specification. The memory 2002 includes an operating system 20021 and an application program 20022, and is configured to store a program, code, or instructions. When a processor or a hardware device executes the program, the code, or the instructions, a processing process related to the first network device in the method embodiments may be completed. Optionally, the memory 2002 may include a read-only memory (ROM) and a random access memory (RAM). The ROM includes a basic input/output system (BIOS) or an embedded system, and the RAM includes an application program and an operating system. When the first network device 2000 needs to be run, a bootloader in a BIOS built into the ROM or in an embedded system is used to boot a system to start, and boot the first network device 2000 to enter a normal running state. After entering the normal running state, the first network device 2000 runs the application program and the operating system in the RAM, to complete the processing process of the first network device 2000 in the method embodiments.

It may be understood that, FIG. 8 shows only a simplified design of the first network device 2000. In actual application, the first network device may include any quantity of interfaces, processors, or memories.

Figure 9:
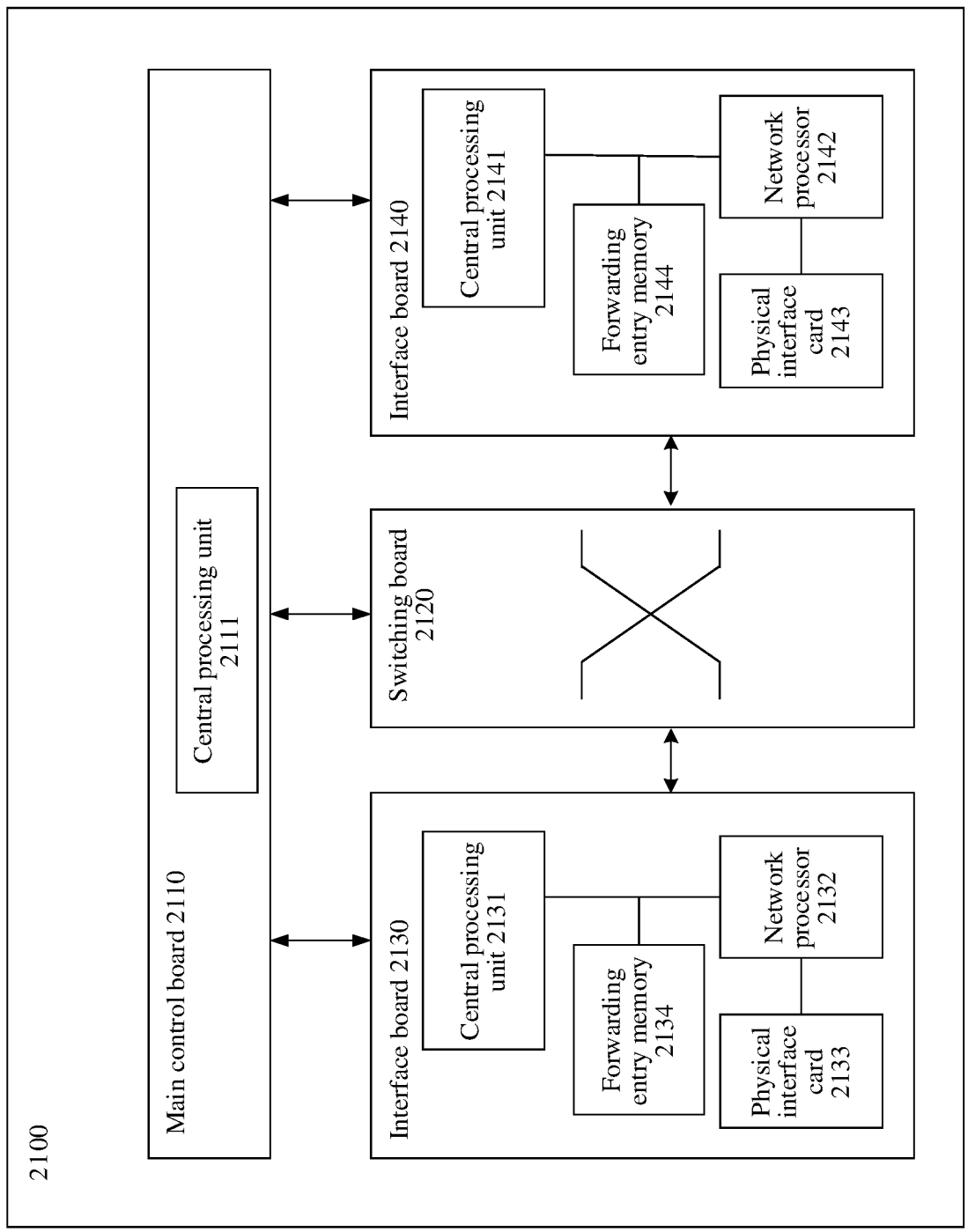
FIG. 9 is a schematic diagram of a hardware structure of another first network device 2100 according to an embodiment of this application.

FIG. 9 is a schematic diagram of a hardware structure of another first network device 2100 according to an embodiment of this application. The first network device 2100 shown in FIG. 9 may perform corresponding steps performed by the first network device in the method of the foregoing embodiments.

As shown in FIG. 9, the first network device 2100 includes: a main control board 2110, an interface board 2130, a switching board 2120, and an interface board 2140. The main control board 2110, the interface board 2130, the interface board 2140, and the switching board 2120 are connected to a system backboard through a system bus for interworking. The main control board 2110 is configured to complete functions such as system management, device maintenance, and protocol processing. The switching board 2120 is configured to exchange data between interface boards (where the interface board is also referred to as a line card or a service board). The interface boards 2130 and 2140 are configured to provide various service interfaces (such as a POS interface, a GE interface, and an ATM interface), and forward a data packet.

The interface board 2130 may include a central processing unit 2131, a forwarding entry memory 2134, a physical interface card 2133, and a network processor 2132. The central processing unit 2131 is configured to control and manage the interface board, and communicate with a central processing unit on the main control board. The forwarding entry memory 2134 is configured to save entries. The physical interface card 2133 is configured to receive and send traffic.

It should be understood that, an operation on the interface board 2140 is consistent with an operation on the interface board 2130 in this embodiment of this application. For brevity, details are not described again.

It should be understood that, the first network device 2100 in this embodiment may correspond to the functions and/or the various implemented steps in the method embodiments. Details are not described herein again.

In addition, it should be noted that, there may be one or more main control boards. When there are a plurality of main control boards, the main control boards may include an active main control board and a standby main control board. There may be one or more interface boards. A first network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the first network device may not include a switching board, and the interface board undertakes a service data processing function of an entire system. In a distributed forwarding architecture, the first network device may include at least one switching board, to implement data exchange between a plurality of interface boards through the switching board, and provide large-capacity data exchange and processing capabilities. Therefore, the data access and processing capabilities of the distributed architecture-based first network device are stronger than those of the centralized architecture-based device. A specific architecture that is to be used depends on a specific networking deployment scenario. This is not limited herein.

An embodiment of this application further provides a computer-readable medium. The computer-readable medium stores program code. When the computer program code is run on a computer, the computer is enabled to perform the method performed by the foregoing first network device. The computer-readable storage includes, but is not limited to, one or more of the following: a read-only memory (ROM), a programmable ROM (PROM), an erasable PROM (EPROM), a Flash memory, an electrically EPROM (EEPROM), and a hard drive.

An embodiment of this application further provides a chip system, used in a first network device. The chip system includes: at least one processor, at least one memory, and an interface circuit. The interface circuit is responsible for information exchange between the chip system and the outside. The at least one memory, the interface circuit, and the at least one processor are interconnected through a line. The at least one memory stores instructions, and the instructions are executed by the at least one processor, to perform operations of the first network device in the methods in the foregoing aspects.

In a specific implementation process, the chip may be implemented in a form of a central processing unit (CPU), a micro controller unit (MCU), a micro processing unit (MPU), a digital signal processor (DSP), a system on chip (SoC), an application-specific integrated circuit (ASIC), a field programmable gate array (FPGA), or a programmable logic device (PLD).

An embodiment of this application further provides a computer program product, used in a first network device. The computer program product includes a series of instructions, and when the instructions are executed, operations of the first network device in the methods in the foregoing aspects are performed.

It should be understood that, sequence numbers of the foregoing processes do not mean execution sequences in the embodiments of this application. The execution sequences of the processes should be determined based on functions and internal logic of the processes, and should not constitute any limitation on implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the objective of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division of the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An internet protocol version 6 IPv6 packet sending method, wherein the method comprises:
   receiving, by a first network device, a first internet protocol version 6 (IPv6) packet, wherein the first IPv6 packet comprises a packet header and an inner packet, and wherein the packet header comprises a hop limit field;
   determining, by the first network device, whether a value of the hop limit field in the first IPv6 packet is less than or equal to a preset threshold on the first network device, wherein the preset threshold is a number greater than or equal to 2;
   determining, by the first network device, whether the inner packet is a multicast packet; and
   avoiding, by the first network device, forwarding the first IPv6 packet when the value of the hop limit field in the first IPv6 packet is less than or equal to the preset threshold and the inner packet is a multicast packet.

2. The method according to claim 1, wherein the method further comprises:
   discarding, by the first network device, the first IPv6 packet.

3. The method according to claim 1, wherein the preset threshold is a threshold determined based on a quantity of one or more consecutive second network devices connected to the first network device, wherein a second network device is a network device that performs unicast forwarding based on a destination address of an IPv6 packet received from the first network device, and wherein the destination address of the IPv6 packet received from the first network device is different from an address of the second network device.

4. The method according to claim 1, wherein the method further comprises:
receiving, by the first network device, a second IPv6 packet, wherein the second IPv6 packet comprises a packet header and an inner packet, and wherein the packet header comprises a hop limit field;
determining, by the first network device, whether a value of the hop limit field in the second IPv6 packet is less than or equal to the preset threshold;
determining, by the first network device, whether the inner packet of the second IPv6 packet is a multicast packet; and
processing, by the first network device, the second IPv6 packet when the value of the hop limit field in the second IPv6 packet is greater than the preset threshold and the inner packet of the second IPv6 packet is a multicast packet.

5. The method according to claim 4, wherein the processing, by the first network device, the second IPv6 packet comprises:
sending, by the first network device, based on the first network device being an intermediate forwarding device, the second IPv6 packet to a second network device, and forwarding, by the second network device, the second IPv6 packet to a third network device, wherein a destination address of the second IPv6 packet is an address of the third network device; or
decapsulating, by the first network device, based on the first network device being an egress device, the second IPv6 packet, and forwarding the inner packet obtained after the second IPv6 packet is decapsulated.

6. The method according to claim 1, wherein the multicast packet comprises any one of an IPv6 multicast packet, an internet protocol version 4 (IPv4) multicast packet, or an ethernet packet.

7. The method according to claim 1, wherein the value of the hop limit field in the first IPv6 packet is less than or equal to the preset threshold, and the method further comprises:
avoiding, by the first network device, forwarding the IPv6 packet based on a transmission rate of the first IPv6 packet being greater than a preset rate and the inner packet of the first IPv6 packet being an operation administration and maintenance (OAM) packet.

8. The method according to claim 7, wherein the method further comprises:
discarding, by the first network device, the first IPv6 packet.

9. The method according to claim 7, wherein the value of the hop limit field in the first IPv6 packet is less than or equal to the preset threshold, and the method further comprises:
forwarding, by the first network device, the first IPv6 packet based on the transmission rate of the first IPv6 packet being less than or equal to the preset rate and the inner packet being a multicast OAM packet.

10. A first network device, comprising:
a receiver,
a processor; and
a non-transitory computer-readable storage medium storing a program to be executed by the processor, the program including instructions to:
receive, through the receiver, a first internet protocol version 6 (IPv6) packet, wherein the first IPv6 packet comprises a packet header and an inner packet, and wherein the packet header comprises a hop limit field;
determine whether a value of the hop limit field in the first IPv6 packet is less than or equal to a preset threshold on the first network device, wherein the preset threshold is a number greater than or equal to 2,
determine whether the inner packet is a multicast packet; and
avoid forwarding the first IPv6 packet based on the value of the hop limit field in the first IPv6 packet being less than or equal to the preset threshold and the inner packet being a multicast packet.

11. The first network device according to claim 10, wherein the instructions further include instructions to:
discard the first IPv6 packet.

12. The first network device according to claim 10, wherein the preset threshold is a threshold determined based on a quantity of one or more consecutive second network devices connected A to the first network device, wherein a second network device is a network device that performs unicast forwarding based on a destination address of an IPv6 packet received from the first network device, and wherein the destination address of the IPv6 packet received from the first network device is different from an address of the second network device.

13. The first network device according to claim 10, wherein the instructions further includes instructions to:
receive a second IPv6 packet, wherein the second IPv6 packet comprises a packet header and an inner packet, and wherein the packet header comprises a hop limit field;
determine whether a value of the hop limit field in the second IPv6 packet is less than or equal to the preset threshold;
determine whether the inner packet of the second IPv6 packet is the multicast packet; and
process the second IPv6 packet based on the value of the hop limit field in the second IPv6 packet being greater than the preset threshold and the inner packet of the second IPv6 packet being a multicast packet.

14. The first network device according to claim 13, wherein the instruction to process the second IPv6 packet further include instructions to:
send, based on the first network device being an intermediate forwarding device, the second IPv6 packet to a second network device, and forward, by the second network device, the second IPv6 packet to a third network device, wherein a destination address of the second IPv6 packet is an address of the third network device; or
decapsulate, based on the first network device being an egress device, the second IPv6 packet, and forward the inner packet obtained after the second IPv6 packet is decapsulated.

15. The first network device according to claim 10, wherein the multicast packet comprises any one of an IPv6 multicast packet, an internet protocol version 4 (IPv4) multicast packet, or an ethernet packet.

16. The first network device according to claim 10, wherein the value of the hop limit field in the first IPv6 packet is less than or equal to the preset threshold, and the instructions further include instructions to:
avoid forwarding the IPv6 packet based on a transmission rate of the first IPv6 packet being greater than a preset rate and the inner packet of the first IPv6 packet being an operation administration and maintenance (OAM) packet.

17. The first network device according to claim 16, the instructions further include instructions to:
discard the first IPv6 packet.

18. The first network device according to claim 16, wherein the value of the hop limit field in the first IPv6 packet is less than or equal to the preset threshold, and wherein the instructions further include instructions to:
forward the first IPv6 packet based on the transmission rate of the first IPv6 packet being less than or equal to the preset rate and the inner packet being a multicast OAM packet.

19. A non-transitory computer-readable storage medium storing a program to be executed by a processor in a first network device, the program including instructions to:
receive, through a receiver, a first internet protocol version 6 (IPv6) packet, wherein the first IPv6 packet comprises a packet header and an inner packet, and wherein the packet header comprises a hop limit field;
determine whether a value of the hop limit field in the first IPv6 packet is less than or equal to a preset threshold on the first network device, wherein the preset threshold is a number greater than or equal to 2,
determine whether the inner packet is a multicast packet; and
avoid forwarding the first IPv6 packet based on the value of the hop limit field in the first IPv6 packet being less than or equal to the preset threshold and the inner packet being a multicast packet.

20. The non-transitory computer-readable storage medium according to claim 19, wherein the instructions further include instructions to:
discard the first IPv6 packet.

* * * * *

UNITED STATES PATENT AND TRADEMARK OFFICE
CERTIFICATE OF CORRECTION

PATENT NO. : 12,425,447 B2
APPLICATION NO. : 18/164415
DATED : September 23, 2025
INVENTOR(S) : Xie et al.

Page 1 of 1

It is certified that error appears in the above-identified patent and that said Letters Patent is hereby corrected as shown below:

In the Claims

In Column 32, in Claim 12, Line 22, after "connected" delete "A".

Signed and Sealed this
Fourth Day of November, 2025

John A. Squires
*Director of the United States Patent and Trademark Office*